United States Patent
Kondo

(10) Patent No.: US 11,209,610 B2
(45) Date of Patent: Dec. 28, 2021

(54) ZOOM LENS AND IMAGING APPARATUS

(71) Applicant: FUJIFILM Corporation, Tokyo (JP)

(72) Inventor: Masato Kondo, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 235 days.

(21) Appl. No.: 16/416,306

(22) Filed: May 20, 2019

(65) Prior Publication Data

US 2019/0361195 A1 Nov. 28, 2019

(30) Foreign Application Priority Data

May 28, 2018 (JP) ............................. JP2018-101266

(51) Int. Cl.
| | | |
|---|---|---|
| *G02B 3/02* | (2006.01) | |
| *G02B 13/18* | (2006.01) | |
| *G02B 9/34* | (2006.01) | |
| *H04N 5/232* | (2006.01) | |
| *G02B 7/10* | (2021.01) | |
| *G02B 15/14* | (2006.01) | |

(52) U.S. Cl.
CPC ............... *G02B 9/34* (2013.01); *G02B 7/10* (2013.01); *G02B 15/144113* (2019.08); *H04N 5/23296* (2013.01)

(58) Field of Classification Search
CPC .......... G02B 7/10; G02B 9/34; G02B 15/173; G02B 15/14; G02B 15/144113; G03B 5/00; H04N 5/23296
USPC ........................................ 359/683, 684, 687
See application file for complete search history.

(56) References Cited

U.S. PATENT DOCUMENTS

| | | | | |
|---|---|---|---|---|
| 8,582,212 | B2* | 11/2013 | Ogata | G02B 15/173 359/686 |
| 10,146,031 | B2* | 12/2018 | Tomioka | G02B 13/0035 |
| 2009/0086321 | A1* | 4/2009 | Mizuguchi | G02B 27/646 359/557 |
| 2011/0228407 | A1* | 9/2011 | Yamaguchi | G02B 15/173 359/687 |

(Continued)

FOREIGN PATENT DOCUMENTS

| | | |
|---|---|---|
| JP | S58-144808 A | 8/1983 |
| JP | S58-150925 A | 9/1983 |

(Continued)

OTHER PUBLICATIONS

An Office Action; "Notice of Reasons for Refusal", dated May 11, 2021, which corresponds to Japanese Patent Application No. 2018-101266 and is related to U.S. Appl. No. 16/416,306; with English language translation.

*Primary Examiner* — Mahidere S Sahle

(74) *Attorney, Agent, or Firm* — Studebaker & Brackett PC

(57) ABSTRACT

The zoom lens consists of a positive first lens group, a negative second lens group moving during zooming, a positive third lens group moving during zooming, and a positive fourth lens group which does not move during zooming in order from an object side. Only the third lens group moves during focusing. A lens surface closest to an object is a convex surface. A conditional expression of $5<TL^2/(Y\times ft)<9.5$ which is related to a total optical length TL at a telephoto end, a maximum image height Y, and a focal length ft of the entire system at the telephoto end in a state in which an object at infinity is in focus is satisfied.

17 Claims, 20 Drawing Sheets

(56) References Cited

U.S. PATENT DOCUMENTS

2015/0077859 A1\* 3/2015 Kanetaka ............ G02B 15/177
359/664
2016/0062095 A1 3/2016 Kawamura
2016/0349505 A1\* 12/2016 Kawamura ............ G02B 15/20

FOREIGN PATENT DOCUMENTS

| JP | 2003-344766 A | 12/2003 |
| JP | 2011-197302 A | 10/2011 |
| JP | 2015-212724 A | 11/2015 |
| JP | 2016-050949 A | 4/2016 |

\* cited by examiner

FIG. 2
EXAMPLE 1
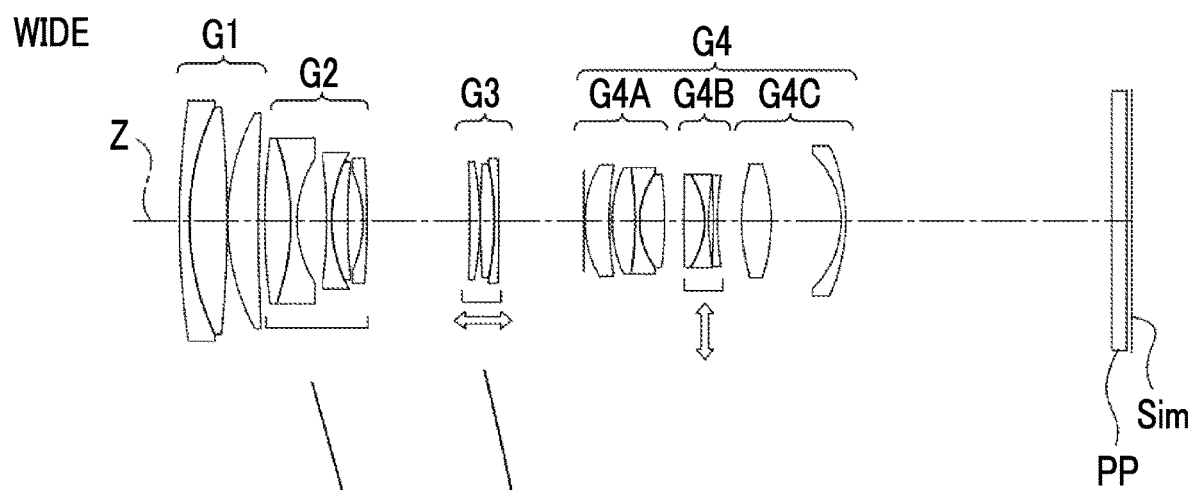
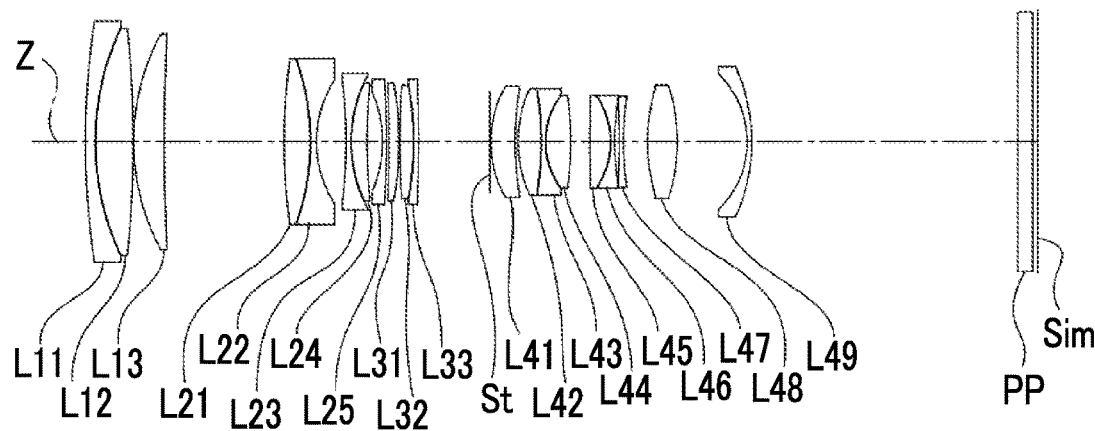

EXAMPLE 2

EXAMPLE 3

EXAMPLE 4

EXAMPLE 5

EXAMPLE 6

FIG. 8
EXAMPLE 7
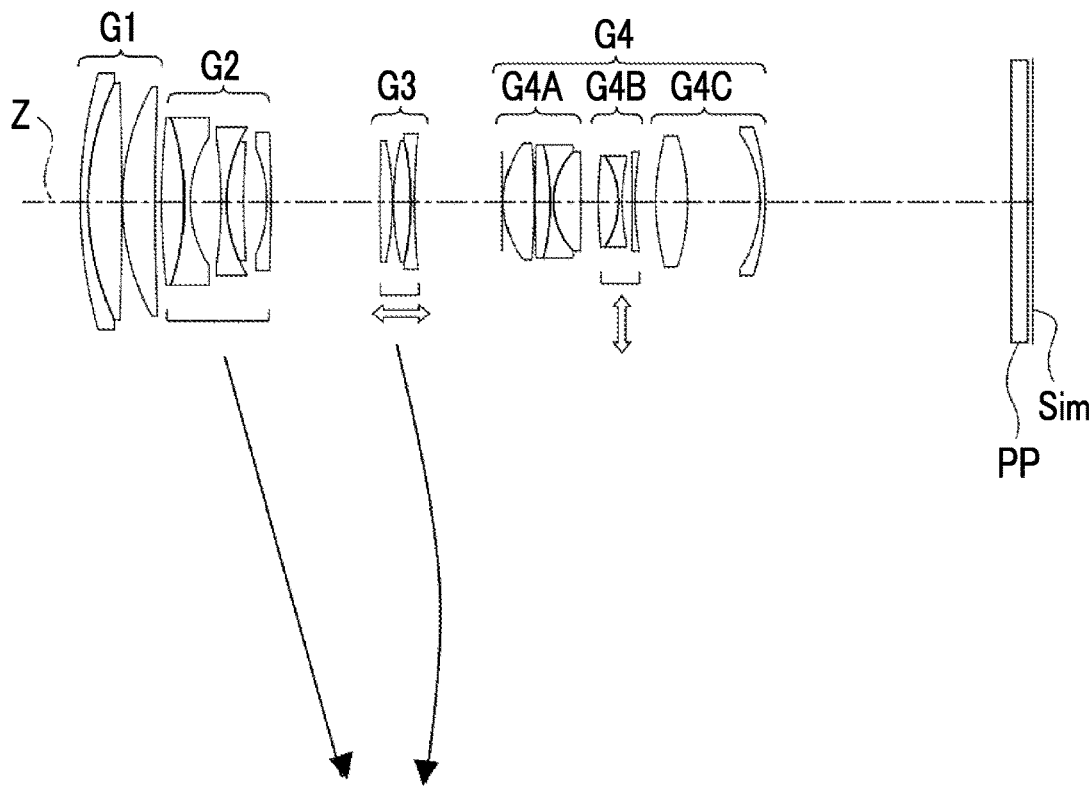
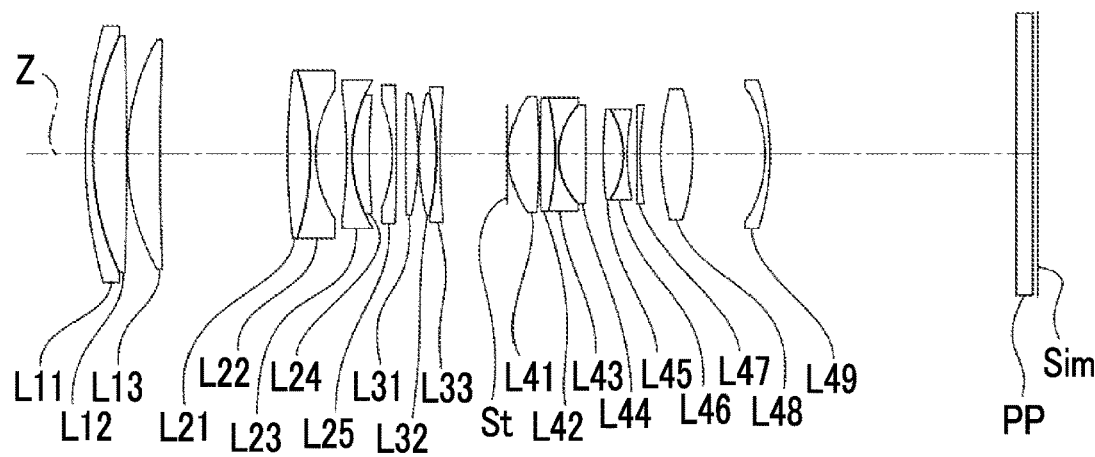

FIG. 9
EXAMPLE 8
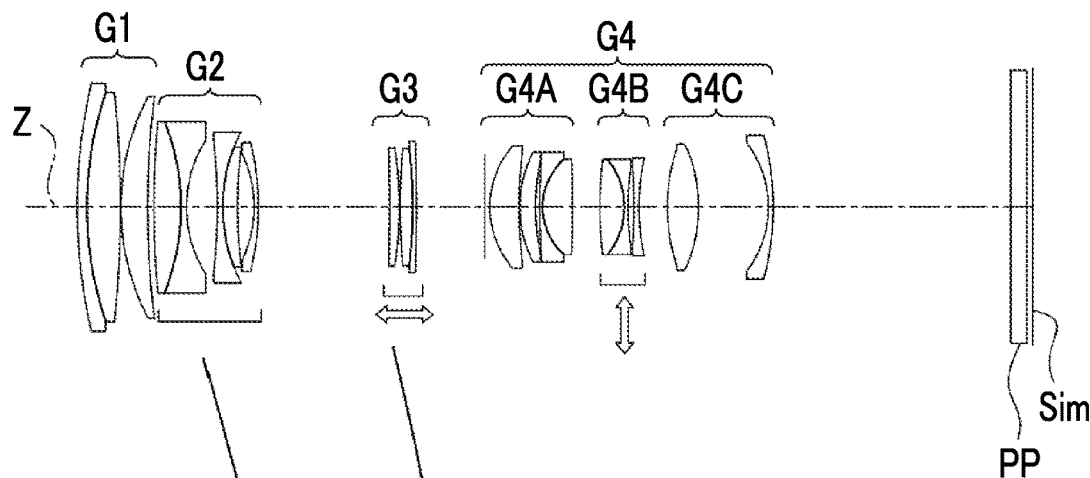
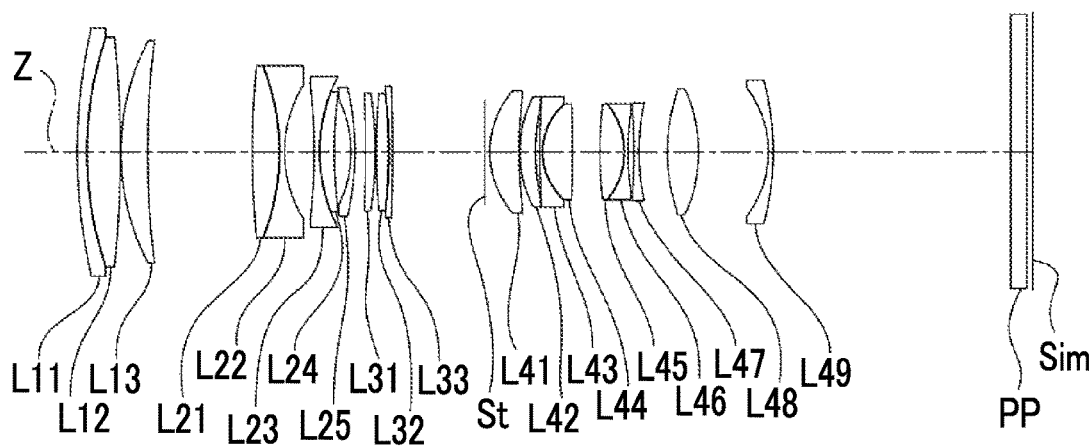

EXAMPLE 9

FIG. 13
EXAMPLE 3
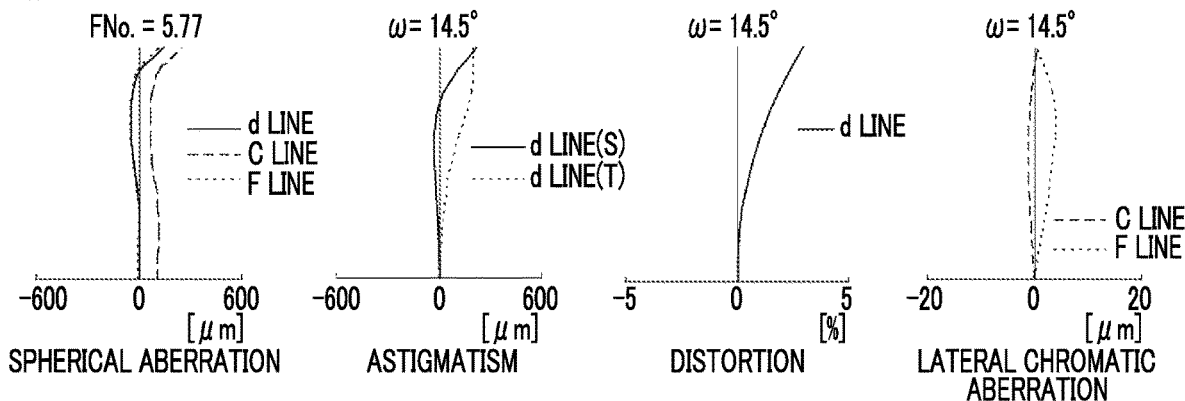
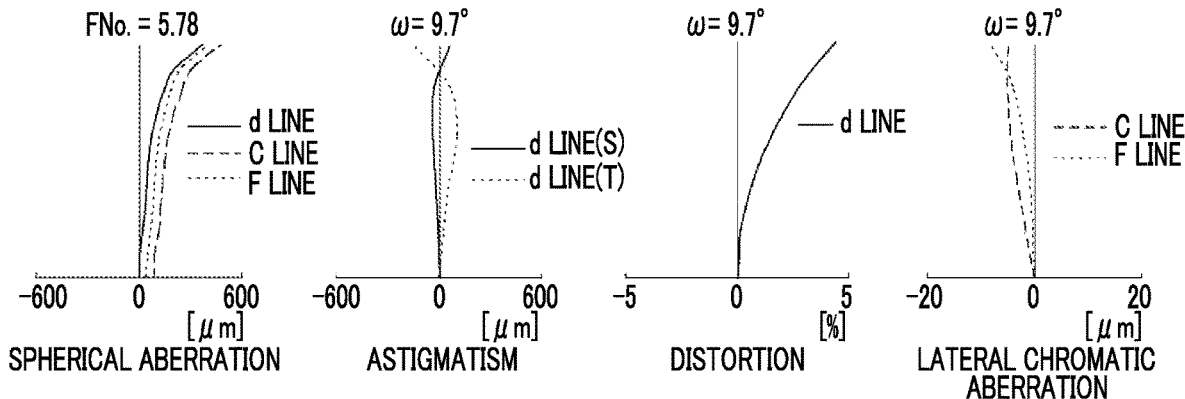
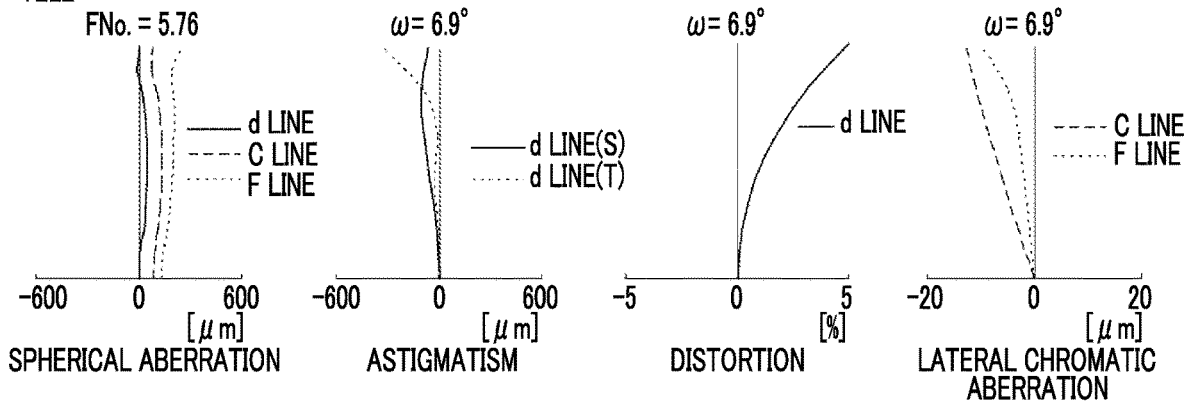

EXAMPLE 6

EXAMPLE 7

ZOOM LENS AND IMAGING APPARATUS

CROSS-REFERENCE TO RELATED APPLICATIONS

The present application claims priority under 35 U.S.C. § 119 to Japanese Patent Application No. 2018-101266, filed on May 28, 2018. The above application is hereby expressly incorporated by reference, in its entirety, into the present application.

BACKGROUND OF THE INVENTION

1. Field of the Invention

The present disclosure relates to a zoom lens and an imaging apparatus.

2. Description of the Related Art

In the related art, lens systems each having a four-group configuration described in, for example, JP2016-050949A, JP2011-197302A, JP2015-212724A, and JP2003-344766A has been known as a zoom lens applicable to an imaging apparatus such as a digital camera. JP2016-050949A, JP2011-197302A, JP2015-212724A, and JP2003-344766A describes zoom lenses which consists of a first lens group having a positive refractive power, a second lens group having a negative refractive power, a third lens group having a positive refractive power, and a fourth lens group having a positive refractive power in order from an object side to an image side and performs focusing by moving a part of the lens groups or the entire one lens group.

SUMMARY OF THE INVENTION

In recent years, there is a need for a zoom lens to be mounted on an imaging apparatus to have a small size while maintaining high performance in order to achieve a reduction in size of the imaging apparatus. In recent years, since there is an increasing need for high-speed autofocusing, there is a need for a reduction in size and a decrease in weight of the lens group moving during focusing.

The lens systems described in JP2016-050949A and JP2011-197302A need to have a smaller size in order to sufficiently cope with the recent needs with consideration for both an image size and a focal length. The lens systems described in JP2015-212724A, and JP2003-344766A adopt a configuration in which focusing is performed by moving the lens within the first lens group. Since a diameter of the lens group moving during focusing is large, there is a disadvantage in achieving high-speed focusing.

The present disclosure has been made in view of the aforementioned circumstances. An object to be resolved by an embodiment of the present invention is to provide a zoom lens which has a small size, and is advantageous for high-speed focusing while maintaining favorable performance, and an imaging apparatus comprising the zoom lens.

The following aspects are included in specific means for resolving the aforementioned object. A zoom lens according to a first aspect consists of: in order from an object side to an image side, a first lens group which has a positive refractive power; a second lens group which has a negative refractive power and moves during zooming; a third lens group which has a positive refractive power and moves during zooming; and a fourth lens group which has a positive refractive power and is fixed with respect to an image plane during zooming, wherein a distance between the lens groups adjacent to each other in an optical axis direction changes during zooming, only the third lens group moves during focusing, an object-side surface of a lens closest to an object is a convex surface, and assuming that a sum of an on-axis distance from a lens surface closest to the object at a telephoto end to a lens surface closest to an image and back focus at an air-equivalent distance is TL, a maximum image height is Y, and a focal length of the zoom lens at the telephoto end in a state in which an object at infinity is in focus is ft, Conditional Expression (1) expressed by $5<TL^2/(Y\times ft)<9.5$ is satisfied.

In accordance with a zoom lens according to a second aspect, in the zoom lens according to the first aspect, the fourth lens group consists of a front group having a positive refractive power, an intermediate group having a negative refractive power, and a rear group having a positive refractive power in order from the object side to the image side, only the intermediate group moves in a direction crossing an optical axis during image shake correction, and a meniscus-shaped single lens having a negative refractive power in which an object-side surface is a concave surface is disposed on a side of the rear group closest to the image.

In accordance with a zoom lens according to a third aspect, in the zoom lens according to the second aspect, assuming that a focal length of the single lens of the rear group closest to the image is f41r and a focal length of a single lens or a cemented lens disposed so as to be adjacent to the object side of the single lens of the rear group closest to the image is f42r, Conditional Expression (2) expressed by $-0.75<f42r/f41r<-0.2$ is satisfied.

In accordance with a zoom lens according to a fourth aspect, in the zoom lens according to the second or third aspect, assuming that a focal length of the single lens of the rear group closest to the image is f41r and an on-axis distance between the single lens of the rear group closest to the image and the lens disposed so as to be adjacent to the object side of the single lens of the rear group closest to the image is d4b12r, Conditional Expression (3) expressed by $-10<f41r/d4b12r<-2$ is satisfied.

In accordance with a zoom lens according to a fifth aspect, in the zoom lens according to any one of the first to fourth aspects, the first lens group is fixed with respect to the image plane during zooming.

In accordance with a zoom lens according to a sixth aspect, in the zoom lens according to any one of the first to fifth aspects, a negative lens in which an image-side surface is a convex surface is disposed on a side of the second lens group closest to the image.

In accordance with a zoom lens according to a seventh aspect, in the zoom lens according to any one of the first to sixth aspects, assuming that an on-axis distance from a lens surface closest to the object to a lens surface of the first lens group closest to the image is G1TL and an on-axis distance from a lens surface closest to the object at the telephoto end to a lens surface of the fourth lens group closest to the image is Gsum, Conditional Expression (4) expressed by $0.08<G1TL/Gsum<0.14$ is satisfied.

In accordance with a zoom lens according to an eighth aspect, in the zoom lens according to any one of the first to seventh aspects, the first lens group includes at least one set of cemented lens in which a negative lens and a positive lens are cemented to each other in order from the object side.

In accordance with a zoom lens according to a ninth aspect, in the zoom lens according to any one of the first to eighth aspects, the first lens group consists of one negative lens and two positive lenses.

In accordance with a zoom lens according to a tenth aspect, in the zoom lens according to any one of the first to ninth aspects, the third lens group includes at least one positive lens, and assuming that a refractive index of a positive lens within the third lens group closest to the object at a d line is N3p, Conditional Expression (5) expressed by 1.7<N3p<2.2 is satisfied.

In accordance with a zoom lens according to an eleventh aspect, in the zoom lens according to any one of the first to tenth aspects, the third lens group includes at least one set of cemented lens in which a positive lens and a negative lens are cemented to each other in order from the object side.

In accordance with a zoom lens according to a twelfth aspect, in the zoom lens according to any one of the first to eleventh aspects, the third lens group consists of one positive lens and one set of cemented lens.

In accordance with a zoom lens according to a thirteenth aspect, in the zoom lens according to any one of the first to twelfth aspects, the second lens group includes at least one set of cemented lens in which at least one positive lens and at least one negative lens are cemented to each other.

In accordance with a zoom lens according to a fourteenth aspect, in the zoom lens according to the thirteenth aspect, assuming that an absolute value of a difference between an Abbe number of the positive lens within the cemented lens with a d line as a reference and an Abbe number of the negative lens within the cemented lens with the d line as the reference in each cemented lens of the second lens group is vdif and a maximum value of the vdif is vdifmax, Conditional Expression (6) expressed by 30<vdifmax<75 is satisfied.

In accordance with a zoom lens according to a fifteenth aspect, in the zoom lens according to any one of the first to fourteenth aspects, assuming that the back focus at the air-equivalent distance is Bf and a focal length of the entire system at a telephoto end in a state in which an object at infinity is in focus is ft, Conditional Expression (7) expressed by 0.15<Bf/ft<0.4 is satisfied.

In accordance with a zoom lens according to a sixteenth aspect, in the zoom lens according to the first aspect, Conditional Expression (1-1) expressed by 5.5<TL$^2$/(Y×ft)<9 is satisfied.

In accordance with a zoom lens according to a seventeenth aspect, in the zoom lens according to the fourth aspect, Conditional Expression (3-1) expressed by −9<f41r/d4b12r<−3 is satisfied.

In accordance with a zoom lens according to an eighteenth aspect, in the zoom lens according to the seventh aspect, Conditional Expression (4-1) expressed by 0.09<G1TL/Gsum<0.13 is satisfied.

In accordance with a zoom lens according to a nineteenth aspect, in the zoom lens according to the tenth aspect, Conditional Expression (5-1) expressed by 1.8<N3p<2.2 is satisfied.

An imaging apparatus according to a twentieth aspect comprises the zoom lens according to any one of first to nineteenth aspects.

In the present description, it should be noted that the terms "consisting of ~" and "consists of ~" mean that the imaging lens may include not only the above-mentioned elements but also lenses substantially having no refractive power, optical elements, which are not lenses, such as a stop, a filter, and a cover glass, and mechanism parts such as a lens flange, a lens barrel, an imaging element, and a camera shake correction mechanism in addition to the illustrated constituent elements.

In the present description, the term "~ group that has a positive refractive power" means that the group has a positive refractive power as a whole. Likewise, the term "~ group that has a negative refractive power" means that the group has a negative refractive power as a whole. The "lens having a positive refractive power" and the "positive lens" are synonymous. The "lens having a negative refractive power" and the "negative lens" are synonymous. The "lens group", the "front group", the "intermediate group", and the "rear group" are not limited to consisting of a plurality of lenses, and may consist of only one lens.

The "single lens" means one lens which is not cemented. Here, a composite aspheric lens (a lens which is integrally composed of a spherical lens and an aspheric-shaped film formed on this spherical lens and functions as one aspherical lens as a whole) is not regarded as the cemented lens, and is treated as one lens. It is assumed that a reference of a refractive power related to a lens including an aspherical surface and a surface shape of a lens surface are considered in paraxial region unless otherwise noted. The "back focus" is the on-axis distance from the lens surface closest to the image to the focus position on the image side. The "focal length" used in Conditional Expressions is a paraxial focal length. The values in Conditional Expressions are values in a case where the d line is used as the reference. The "d line", "C line", and "F line" described in the present specification are bright lines. A wavelength of the d line is 587.56 nm (nanometers), a wavelength of the C line is 656.27 nm (nanometers), and a wavelength of the F line is 486.13 nm (nanometers).

According to an embodiment of the present invention, it is possible to provide a zoom lens which has a small size, and is advantageous for high-speed focusing while maintaining favorable performance, and an imaging apparatus comprising the zoom lens.

BRIEF DESCRIPTION OF THE DRAWINGS

FIG. 2 is a diagram showing cross sections of configurations of a zoom lens according to Example 1 of the present invention at a wide-angle end and at a telephoto end and movement loci.

FIG. 8 is a diagram showing cross sections of configurations of a zoom lens according to Example 7 of the present invention at the wide-angle end and at the telephoto end and movement loci.

FIG. 9 is a diagram showing cross sections of configurations of a zoom lens according to Example 8 of the present invention at the wide-angle end and at the telephoto end and movement loci.

FIG. 13 shows aberration diagrams of the zoom lens according to Example 3 of the present invention.

DESCRIPTION OF THE PREFERRED EMBODIMENTS

Figure 1:
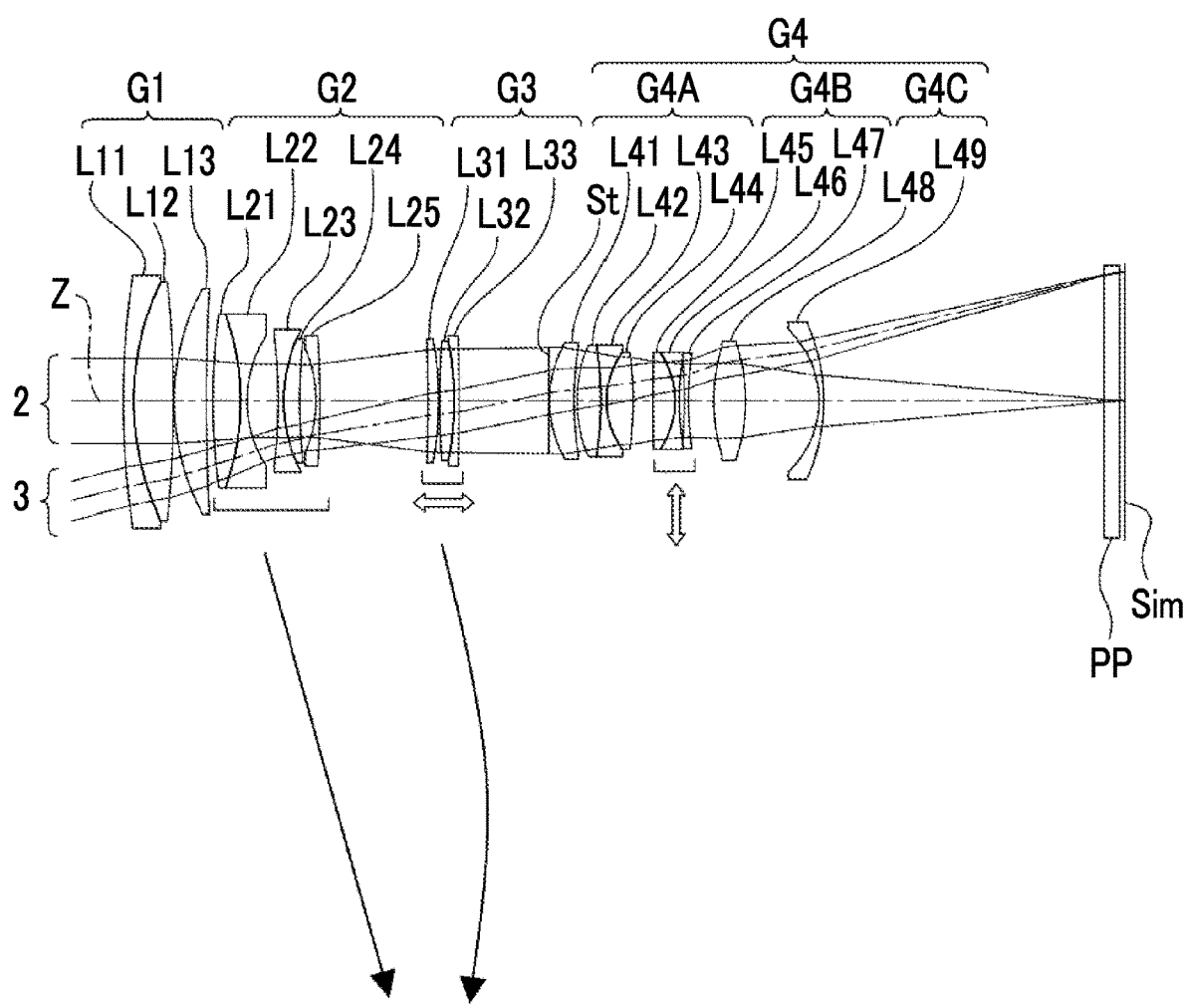
FIG. 1 is a diagram showing a cross section of optical paths and a configuration of a zoom lens according to an embodiment of the present invention, and a movement locus.

Hereinafter, embodiments of a zoom lens of the present disclosure will be described with reference to drawings. FIG. 1 shows optical paths and a cross-sectional view at a wide-angle end of a zoom lens according to an embodiment of the present invention. The example shown in FIG. 1 corresponds to the zoom lens according to Example 1 to be described later. FIG. 1 shows a state where an object at infinity is in focus, where the left side of the drawing is an object side and the right side of the drawing is an image side, and shows on-axis rays 2 and maximum-view-angle rays 3 for the optical paths.

In FIG. 1, it is assumed that the zoom lens is applied to an imaging apparatus, and an example in which a parallel flat optical member PP is disposed between the zoom lens and an image plane Sim is illustrated. The optical member PP is a member assumed to include various filters and/or a cover glass. The various filters are, for example, a low-pass filter, an infrared cut filter, and a filter for cutting a specific wavelength range. The optical member PP is a member having no refractive power, and the optical member PP may be omitted.

The zoom lens of the present disclosure consists of a first lens group G1 having a positive refractive power, a second lens group G2 having a negative refractive power, a third lens group G3 having a positive refractive power, and a fourth lens group G4 having a positive refractive power in order from the object side to the image side along an optical axis Z. During zooming from the wide-angle end to a telephoto end, the second lens group G2 and the third lens group G3 move in an optical axis direction with different loci, and the fourth lens group G4 is fixed with respect to the image plane Sim. During zooming from the wide-angle end to the telephoto end, all distances between adjacent lens groups of the four lens groups in the optical axis direction change.

For example, the first lens group G1 may be fixed with respect to the image plane Sim during zooming, as shown in FIG. 1. In such a case, since it is possible to reduce the number of movable lens groups, it is possible to decrease the influence of eccentricity, and it is possible to simplify a configuration of a lens frame. It is possible to set a total optical length to a constant value during zooming. In FIG. 1, under the second lens group G2 and the third lens group G3 moving during zooming, a schematic movement locus of each lens group during zooming from the wide-angle end to the telephoto end is represented by a black solid arrow.

The first lens group G1 is a lens group closest to the object. The lens group having the positive refractive power is disposed so as to be closest to the object, and thus, there is an advantage in reducing the total optical length. Accordingly, it is easy to reduce the size of the lens system. An object-side surface of the lens closest to the object is a convex surface. With this configuration, there is an advantage in reducing the total optical length.

It is preferable that the first lens group G1 includes at least one set of cemented lens in which a negative lens and a positive lens are cemented in order from the object side. In such a case, there is an advantage in correcting chromatic aberration. It is preferable that the first lens group G1 consists of one negative lens and two positive lenses. In such a case, it is possible to reduce the total optical length while securing the minimum number of lenses required for favorably correcting aberration. For example, the first lens group G1 shown in FIG. 1 consists of three lenses of a negative lens L11, a positive lens L12, and a positive lens L13 in order from the object side to the image side. The lens L11 and the lens L12 are cemented to each other.

It is preferable that a negative lens of which an image-side surface is a convex surface is disposed on a side of the second lens group G2 closest to the image. In such a case, it is possible to restrain a variation in field curvature and a variation in astigmatism along with zooming.

It is preferable that the second lens group G2 includes at least one set of cemented lens in which at least one positive lens and at least one negative lens are cemented to each other. In such a case, there is an advantage in correcting chromatic aberration. For example, the second lens group G2 shown in FIG. 1 consists of a positive lens L21, a negative lens L22, a negative lens L23, a positive lens L24, and a negative lens L25 in order from the object side to the image side. The lens L21 and the lens L22 are cemented to each other. The lens L23 and the lens L24 are cemented to each other.

The third lens group G3 moves during zooming and during focusing. In the zoom lens of the present disclosure, a lens group (hereinafter, referred to as a focus lens group) moving during focusing is composed of only third lens group G3. The focus lens group is disposed approximately in the middle position of the lens system, and thus, a lens diameter of the focus lens group can be reduced. Accordingly, there is an advantage in achieving high-speed focusing. In the example shown in FIG. 1, a configuration in which the entire third lens group G3 integrally moves in the optical axis direction during focusing is adopted. A white left-right arrow under the third lens group G3 of FIG. 1 indicates that the third lens group G3 is the focus lens group.

It is preferable that the third lens group G3 includes at least one set of cemented lens in which a positive lens and a negative lens are cemented to each other in order from the object side. In such a case, it is easy to restrain a variation in longitudinal chromatic aberration and a variation in lateral chromatic aberration during focusing.

It is preferable that the third lens group G3 consists of one positive lens and one set of cemented lens. In such a case, it is possible to favorably correct various aberrations caused in the third lens group G3, and it is easy to restrain a variation in aberration during focusing. In a case where the third lens group G3 consists of one positive lens and one set of cemented lens, it is preferable that the cemented lens of the third lens group G3 includes at least one positive lens and at least one negative lens. In such a case, it is easy to restrain a variation in longitudinal chromatic aberration and a variation in lateral chromatic aberration during focusing. The lens of the third lens group G3 closest to the object may be the positive lens. In such a case, it is easy to restrain a spherical aberration. For example, the third lens group G3 shown in FIG. 1 consists of three lenses of a positive lens L31, a positive lens L32, and a negative lens L33 in order from the object side to the image side, and the lens L32 and the lens L33 are cemented to each other.

The fourth lens group G4 is a lens group fixed with respect to the image plane Sim during zooming. With this configuration, it is possible to reduce the number of movable lens groups, it is possible to decrease the influence of eccentricity, and it is possible to simplify the configuration of the lens frame.

As illustrated in FIG. 1, it is preferable that the fourth lens group G4 consists of a front group G4A having a positive refractive power, an intermediate group G4B having a negative refractive power, and a rear group G4C having a positive refractive power in order from the object side to the image side and only the intermediate group G4B moves in a direction crossing the optical axis Z during image shake correction. In a case where the fourth lens group G4 consists of the positive, negative, and positive groups in order from the object side to the image side in this manner, it is easy to favorably correct distortion. The refractive power of the lens group (hereinafter, referred to an anti-vibration lens group) moving during image shake correction and the refractive power of the lens group adjacent to the anti-vibration lens group are opposite signs, and thus, it is easy to increase the refractive power of the anti-vibration lens group and it is easy to obtain a large image shake correction effect even though a movement amount of the anti-vibration lens group is small.

In a case where the fourth lens group G4 consists of the front group G4A, the intermediate group G4B, and the rear group G4C, it is preferable that a meniscus-shaped single lens having a negative refractive power in which an object-side surface is a concave surface is disposed on a side of the rear group G4C closest to the image. In such a case, since it is possible to decrease an angle formed by a principal ray of a marginal ray and a normal of a lens surface, it is easy to reduce the total optical length while restraining the occurrence of the astigmatism.

For example, the front group G4A shown in FIG. 1 consists of an aperture stop St, and four lenses of a positive lens L41, a positive lens L42, a negative lens L43, and a positive lens L44 in order from the object side to the image side. The intermediate group G4B consists of three lenses of a positive lens L45, a negative lens L46, and a negative lens L47 in order from the object side to the image side. The rear group G4C consists of two lenses of a positive lens L48 and a negative lens L49 in order from the object side to the image side. The lens L42, the lens L43, and the lens L44 are cemented to each other. The lens L45 and the lens L46 are cemented to each other. A white up-down arrow under the intermediate group G4B of FIG. 1 indicates that the intermediate group G4B is the anti-vibration lens group.

In the example of FIG. 1, the aperture stop St is disposed on a side of the fourth lens group G4 closest to the object. There is an advantage in reducing a diameter of the lens by disposing the aperture stop St in this position. The lens group which does not move during zooming and is closest to the image includes the aperture stop St, and thus, there is an advantage in restraining a variation in F number during zooming. Here, the position of the aperture stop St may be a position different from the position in the example of FIG. 1. The aperture stop St shown in FIG. 1 does not represent a shape or a size, and represent a position on the optical axis Z.

Next, configurations related to Conditional Expressions will be described. Assuming that a sum of an on-axis distance from a lens surface closest to the object to a lens-surface closest to the image at the telephoto end and back focus at an air-equivalent distance is TL, a maximum image height is Y, and a focal length of the zoom lens at the telephoto end in a state in which the object at infinity is in focus is ft, the zoom lens of the present disclosure satisfies Conditional Expression (1). TL is the total optical length at the telephoto end. In the example shown in FIG. 1, the maximum image height Y is a height from the optical axis Z to a concentrated position of the maximum-view-angle rays 3 on the image plane Sim. The resultant value is not equal to or less than a lower limit of Conditional Expression (1), and thus, it is easy to secure a movable region of the lens group and a movable region of the focus lens group moving during zooming while obtaining favorable optical performance. The resultant value is not equal to or greater than an upper limit of Conditional Expression (1), and thus, there is an advantage in reducing a size of the lens system. In a case where the zoom lens satisfies the following Conditional Expression (1-1), it is possible to obtain more favorable characteristics.

$$5 < TL^2/(Y \times ft) < 9.5 \tag{1}$$

$$5.5 < TL^2/(Y \times ft) < 9 \tag{1-1}$$

In the configuration in which the fourth lens group G4 consists of the front group G4A, the intermediate group G4B, and the rear group G4C and the meniscus-shaped single lens having the negative refractive power in which the object-side surface is the concave surface is disposed on the side of the rear group G4C closest to the image, assuming that a focal length of a single lens of the rear group G4C closest to the image is f41r and a focal length of a single lens or a cemented lens disposed so as to be adjacent to the object side of the single lens of the rear group G4C closest to the image is f42r, it is preferable that the zoom lens satisfies the following Conditional Expression (2). Here, f42r is a focal length of a lens component disposed so as to be adjacent to the object side of the single lens of the rear group G4C closest to the image. The lens component includes only two lenses of which air contact surfaces on the optical axis are the object-side surface and the image-side surface, and one lens component means one single lens or one set of cemented lens. For example, in the example of FIG. 1, a focal length of the lens L48 which is the single lens corresponds to f42r. In the example shown in FIG. 10 according to Example 9 to be described below, the focal length of the cemented lens in which the lens L48 and the lens L49 are cemented to each other corresponds to f42r. The resultant value is not equal to or less than a lower limit of Conditional Expression (2), and thus, a positive refractive power of the rear group G4C does not become too low. Accordingly, it is easy to reduce the total optical length. The resultant value is not equal to or greater than an upper limit of Conditional Expression (2), and thus, the positive refractive power of the rear group G4C does not become too high, it is easy to restrain the spherical aberration from being excessively corrected. In a case where the zoom lens satisfies the following Conditional Expression (2-1), it is possible to obtain more favorable characteristics.

$$-0.75 < f42r/f41r < -0.2 \tag{2}$$

$$-0.65 < f42r/f41r < -0.3 \tag{2-1}$$

In the configuration in which the fourth lens group G4 consists of the front group G4A, the intermediate group G4B, and the rear group G4C and the meniscus-shaped single lens having the negative refractive power in which the object-side surface is the concave surface is disposed on the side of the rear group G4C closest to the image, assuming that the focal length of the single lens of the rear group G4C closest to the image is f41r and an on-axis distance between the single lens of the rear group G4C closest to the image and the lens disposed so as to be adjacent to the object side of the single lens of the rear group G4C closest to the image is d4b12r, it is preferable that the zoom lens satisfies the following Conditional Expression (3). The resultant value is not equal to or less than a lower limit of Conditional Expression (3), and thus, it is easy to correct the distortion and the astigmatism. The resultant value is not equal to or greater than an upper limit of Conditional Expression (3), and thus, it is easy to reduce the total optical length. In a case where the zoom lens satisfies the following Conditional Expression (3-1), it is possible to obtain more favorable characteristics.

$$-10 < f41r/d4b12r < -2 \tag{3}$$

$$-9 < f41r/d4b12r < -3 \tag{3-1}$$

Assuming that an on-axis distance between the lens surface closest to the object and the lens surface of the first lens group G1 closest to the image is G1TL and an on-axis distance from the lens surface closest to the object at the telephoto end to the lens surface of the fourth lens group G4 closest to the image is Gsum, it is preferable that the zoom lens satisfies the following Conditional Expression (4). The resultant value is not equal to or less than a lower limit of Conditional Expression (4), and thus, it is easy to dispose lenses as much as the number of lenses required for favorably correcting the aberration in the first lens group G1. The resultant value is not equal to or greater than an upper limit of Conditional Expression (4), and thus, it is possible to restrain an increase in size of the lens of the first lens group G1. Accordingly, there is an advantage in reducing a size of the lens system in a diameter direction. The resultant value is not equal to or greater than an upper limit of Conditional Expression (4), and thus, it is easy to secure a movable region of the lens group moving during zooming. Accordingly, it is easy to restrain a variation in aberration during zooming. In a case where the zoom lens satisfies the following Conditional Expression (4-1), it is possible to obtain more favorable characteristics.

$$0.08 < G1TL/Gsum < 0.14 \tag{4}$$

$$0.09 < G1TL/Gsum < 0.13 \tag{4-1}$$

Since the third lens group G3 is a lens group having a positive refractive power, and the third lens group includes at least one positive lens. Assuming that a refractive index of the positive lens within the third lens group G3 closest to the object side at a d line is N3p, it is preferable that the zoom lens satisfies the following Conditional Expression (5). The resultant value is not equal to or less than a lower limit of Conditional Expression (5), and thus, it is easy to restrain an increase in movement amount of the third lens group G3 which is the focus lens group during focusing from the object at infinity to an object within a short range. Accordingly, it is possible to contribute to a reduction in total optical length. The resultant value is not equal to or greater than an upper limit of Conditional Expression (5), and thus, it is easy to restrain variations in various aberrations during focusing. In a case where the zoom lens satisfies the following Conditional Expression (5-1), it is possible to obtain more favorable characteristics.

$$1.7 < N3p < 2.2 \tag{5}$$

$$1.8 < N3p < 2.2 \tag{5-1}$$

In the configuration in which the second lens group G2 includes at least one set of cemented lens in which at least one positive lens and at least one negative lens are cemented to each other, assuming that an absolute value of a difference between an Abbe number of the positive lens within the cemented lens with the d line as a reference and an Abbe number of the negative lens within the cemented lens with the d line as a reference in each cemented lens of the second lens group G2 is vdif and a maximum value of the vdif within the second lens group G2 is vdifmax, it is preferable that the zoom lens satisfies the following Conditional Expression (6). The resultant value is not equal to or less than a lower limit of Conditional Expression (6), and thus, it is easy to suitably correct the chromatic aberration. The resultant value is not equal to or greater than an upper limit of Conditional Expression (6), and thus, it is easy to restrain the correction of the chromatic aberration from being excessive. In a case where the zoom lens satisfies the following Conditional Expression (6-1), it is possible to obtain more favorable characteristics.

$$30 < vdifmax < 75 \tag{6}$$

$$35 < vdifmax < 65 \tag{6-1}$$

Assuming that the back focus at the air-equivalent distance is Bf and a focal length of the entire system at the telephoto end in a state in which the object at infinity is in focus is ft, it is preferable that the following Conditional Expression (7) is satisfied. The resultant value is not equal to or less than a lower limit of Conditional Expression (7), and thus, it is easy to increase the back focus. For example, it is easy to secure back focus required for an interchangeable lens in a case where the zoom lens of the present disclosure is used as the interchangeable lens. The resultant value is not equal to or greater than an upper limit of Conditional Expression (7), and thus, it is easy to reduce the total optical length. In a case where the zoom lens satisfies the following Conditional Expression (7-1), it is possible to obtain more favorable characteristics.

$$0.15 < Bf/ft < 0.4 \tag{7}$$

$$0.2 < Bf/ft < 0.35 \tag{7-1}$$

The above-mentioned preferred configurations and available configurations may be any combinations, and it is preferable that the configurations are selectively adopted in accordance with required specification. According to a technology of the present disclosure, it is possible to realize a zoom lens which has a small size, and is advantageous for high-speed focusing while maintaining favorable performance.

Next, numerical examples of the zoom lens according to the present invention will be described.

Example 1

Cross-sectional views of a zoom lens according to Example 1 and schematic movement loci are shown in FIG. 2. FIG. 2 shows a state in which the object at infinity is in focus, where the left side of the drawing is the object side and the right side of the drawing is the image side. In FIG. 2, a wide-angle end state is represented at an upper part labeled by "WIDE", and a telephoto end state is represented at a lower part labeled by "TELE". In FIG. 2, the references of the lens groups are depicted at the upper part, and the references of the lenses are depicted at the lower part. The illustration of the references of the lenses at the upper part and the illustration of the references of the lens groups at the lower part are omitted in order to avoid the complicatedness of the drawing. In FIG. 2, the same arrows as the arrows of FIG. 1 are represented for the lens groups during zooming, focusing, and image shake correction.

The zoom lens according to Example 1 consists of a first lens group G1 having a positive refractive power, a second lens group G2 having a negative refractive power, a third lens group G3 having a positive refractive power, and a fourth lens group G4 having a positive refractive power in order from the object side to the image side. During zooming from the wide-angle end to the telephoto end, the first lens group G1 and the fourth lens group G4 are fixed with respect to the image plane Sim, and the second lens group G2 and the third lens group G3 move while changing a mutual distance in the optical axis direction. The first lens group G1 consists of three lenses of lenses L11 to L13 in order from the object side to the image side. The second lens group G2 consists of five lenses of lenses L21 to L25 in order from the object side to the image side. The third lens group G3 consists of three lenses of lenses L31 to L33 in order from the object side to the image side. The fourth lens group G4 consists of a front group G4A having a positive refractive power, an intermediate group G4B having a negative refractive power, and a rear group G4C having a positive refractive power in order from the object side to the image side. The front group G4A consists of an aperture stop St and four lenses of lenses L41 to L44 in order from the object side to the image side. The intermediate group G4B consists of three lenses of lenses L45 to L47 in order from the object side to the image side. The rear group G4C consists of two lenses of lenses L48 and L49 in order from the object side to the image side. The focus lens group is the entire third lens group G3. The anti-vibration lens group is the entire intermediate group G4B. The outline of the zoom lens according to Example 1 has been described above.

Table 1 shows basic lens data of the zoom lens according to Example 1, Table 2 shows specifications and variable surface distances, and Table 3 shows aspherical surface coefficients thereof. In Table 1, the column of Sn shows surface numbers. The surface closest to the object side is the first surface, and the surface numbers increase one by one toward the image side. The column of R shows radii of curvature of the respective surfaces. The column of D shows surface distances on the optical axis between the respective surfaces and the surfaces adjacent to the image side. Further, the column of Nd shows a refractive index of each constituent element at the d line, and the column of vd shows an Abbe number of each constituent element with the d line as the reference.

In Table 1, a reference sign of a radius of curvature of a surface having a shape in which a convex surface faces the object side is set to be positive, and a reference sign of a radius of curvature of a surface having a shape in which a convex surface faces the image side is set to be negative. Table 1 additionally shows the aperture stop St and the optical member PP. In Table 1, in a place of a surface number of a surface corresponding to the aperture stop St, the surface number and a term of (St) are noted. A value at the bottom place of D in Table 1 indicates a distance between the image plane Sim and the surface closest to the image in the table. In Table 1, the variable surface distances are referenced by the reference signs DD[ ], and are written into places of D, where object side surface numbers of distances are noted in [ ].

In Table 2, values of a zoom ratio Zr, the focal length f of the entire system, the back focus Bf at the air-equivalent distance, the F number FNo., the maximum total angle of view 2ω, the maximum image height Y, and the variable surface distance are represented with the d line as the reference. (°) in the place of 2ω indicates that the unit thereof is a degree. In Table 2, values of a wide-angle end state, a middle focal length state, and a telephoto end state are represented in fields of WIDE, MIDDLE, AND TELE. Values in a state in which the object at infinity is in focus are represented in Tables 1 and 2. A value of f in the field of TELE in Table 2 corresponds to a value of ft in the aforementioned Conditional Expression.

In Table 1, the reference sign * is attached to surface numbers of aspherical surfaces, and numerical values of the paraxial radius of curvature are written into the column of the radius of curvature of the aspherical surface. In Table 3, the column of Sn shows surface numbers of aspherical surfaces, and the columns of KA and Am (m=3, 4, 5, . . . ) show numerical values of the aspherical surface coefficients of the aspherical surfaces. The "E±n" (n: an integer) in numerical values of the aspherical surface coefficients of Table 3 indicates "×10±n". KA and Am are aspherical surface coefficients in an aspherical surface expression expressed in the following expression.

$$Zd = C \times h^2 / \{1 + (1 - KA \times C^2 \times h^2)^{1/2}\} + \Sigma Am \times h^m$$

Here, Zd is an aspherical surface depth (a length of a perpendicular from a point on an aspherical surface at height h to a plane that is perpendicular to the optical axis and contacts with the vertex of the aspherical surface), h is a height (a distance from the optical axis to the lens surface), C: reciprocal of paraxial curvature radius, KA and Am are aspherical surface coefficients, and Σ in the aspherical surface expression means the sum with respect to m.

In data of each table, a degree is used as a unit of an angle, and mm (millimeter) is used as a unit of a length, but appropriate different units may be used since the optical system can be used even in a case where the system is enlarged or reduced in proportion. Further, each of the following tables shows numerical values rounded off to predetermined decimal places.

TABLE 1

Example 1

| Sn | R | D | Nd | νd |
|---|---|---|---|---|
| 1 | 182.7312 | 2.1300 | 1.74950 | 35.02 |
| 2 | 59.7900 | 8.1600 | 1.51680 | 64.21 |
| 3 | −244.1537 | 0.1000 | | |
| 4 | 51.1618 | 6.5800 | 1.43875 | 94.66 |
| 5 | 424.5411 | DD[5] | | |
| 6 | 138.7122 | 5.6300 | 1.83400 | 37.23 |
| 7 | −54.9450 | 1.3100 | 1.58144 | 40.75 |
| 8 | 25.8385 | 6.3700 | | |
| 9 | −109.5983 | 1.1100 | 1.48749 | 70.42 |
| 10 | 31.9650 | 3.4300 | 1.85896 | 22.73 |
| 11 | 128.9091 | 3.3100 | | |
| 12 | −27.9491 | 0.8400 | 1.58144 | 40.75 |
| 13 | −209.8241 | DD[13] | | |
| 14 | −427.6232 | 2.1800 | 1.92287 | 18.90 |
| 15 | −74.1246 | 0.1500 | | |
| 16 | 177.2490 | 3.0100 | 1.62041 | 60.37 |
| 17 | −66.8880 | 1.0100 | 1.95906 | 17.47 |
| 18 | −438.8309 | DD[18] | | |
| 19(St) | ∞ | 0.2000 | | |
| 20 | 25.1162 | 5.0300 | 1.43875 | 94.66 |
| 21 | 73.3817 | 0.6500 | | |
| 22 | 29.4303 | 4.9700 | 1.56883 | 56.06 |
| 23 | −75.0400 | 0.9400 | 1.83481 | 42.73 |
| 24 | 17.6050 | 5.4500 | 1.48749 | 70.42 |
| 25 | −75.4013 | 4.1000 | | |
| 26 | 437.5349 | 4.4800 | 1.64769 | 33.84 |
| 27 | −18.3580 | 0.8700 | 1.62041 | 60.37 |
| 28 | 55.9806 | 1.0200 | | |
| 29 | −127.9899 | 0.8400 | 1.88300 | 39.22 |
| 30 | 67.6556 | 5.1900 | | |
| *31 | 39.2886 | 6.4500 | 1.51760 | 63.50 |
| *32 | −40.9507 | 15.0400 | | |
| 33 | −21.0887 | 1.0000 | 1.48749 | 70.42 |
| 34 | −40.2457 | 57.4777 | | |
| 35 | ∞ | 3.2000 | 1.51680 | 64.20 |
| 36 | ∞ | 1.0314 | | |

TABLE 2

Example 1

| | WIDE | MIDDLE | TELE |
|---|---|---|---|
| Zr | 1.0 | 1.5 | 2.0 |
| f | 101.68 | 152.51 | 203.35 |
| Bf | 60.62 | 60.62 | 60.62 |
| FNo. | 5.70 | 5.71 | 5.70 |
| 2ω (°) | 29.4 | 19.6 | 14.6 |
| Y | 27.35 | 27.35 | 27.35 |
| DD[5] | 1.40 | 17.56 | 25.87 |
| DD[13] | 22.11 | 11.50 | 0.54 |
| DD[18] | 18.27 | 12.72 | 15.37 |

TABLE 3

Example 1

| Sn | 31 | 32 |
|---|---|---|
| KA | 2.8572951E+00 | 1.0000000E+00 |
| A3 | 0.0000000E+00 | 0.0000000E+00 |
| A4 | −7.3711067E−06 | −2.8957588E−06 |
| A5 | −1.7817947E−06 | 3.3996120E−07 |
| A6 | 4.3707776E−07 | −1.5456344E−07 |
| A7 | −2.6735 859E−08 | 4.0287917E−08 |
| A8 | −6.3741378E−09 | −2.9995264E−09 |
| A9 | 8.4356379E−10 | −5.8201593E−10 |
| A10 | 5.3683757E−11 | 9.5104961E−11 |
| A11 | −1.1791015E−11 | 8.0089734E−13 |
| A12 | 4.9091049E−14 | −7.0737478E−13 |
| A13 | 6.2143266E−14 | 1.9090278E−14 |

TABLE 3-continued

Example 1

| Sn | 31 | 32 |
|---|---|---|
| A14 | −1.8069522E−15 | 1.5575916E−15 |
| A15 | −1.2319010E−16 | −7.6779636E−17 |
| A16 | 5.4714530E−18 | 1.8668195E−18 |
| A17 | −2.7239555E−20 | −1.4052547E−19 |
| A18 | 1.9939949E−21 | 9.1768224E−21 |
| A19 | 2.9379048E−22 | 1.2514959E−22 |
| A20 | −1.6186888E−23 | −2.5127160E−23 |

Figure 11:
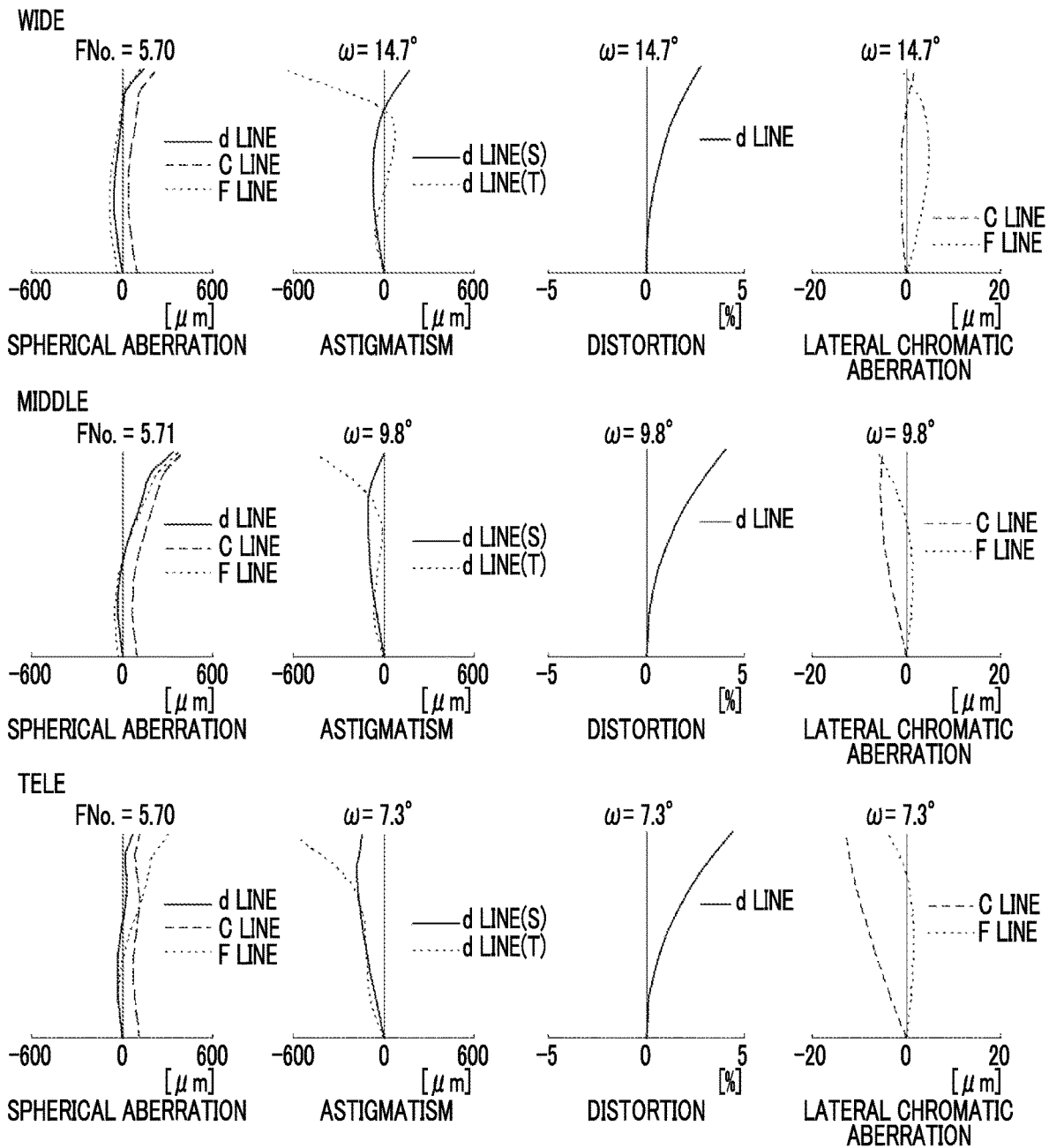
FIG. 11 shows aberration diagrams of the zoom lens according to Example 1 of the present invention.

FIG. 11 shows aberration diagrams of the zoom lens according to Example 1 in a state in which the object at infinity is in focus. In FIG. 11, in order from the left side, spherical aberration, astigmatism, distortion, and lateral chromatic aberration are shown. In FIG. 11, aberration diagrams in the wide-angle end state are represented at an upper part labeled by WIDE, aberration diagrams in the middle focal length state are represented at a middle part labeled by MIDDLE, and aberration diagrams in the telephoto end state are represented at a lower part labeled by TELE. In the spherical aberration diagram, aberrations at the d line, the C line, and the F line are respectively indicated by the solid line, the long dashed line, and the short dashed line. In the astigmatism diagram, aberration in the sagittal direction at the d line is indicated by the solid line, and aberration in the tangential direction at the d line is indicated by the short dashed line. In the distortion diagram, aberration at the d line is indicated by the solid line. In the lateral chromatic aberration diagram, aberrations at the C line and the F line are respectively indicated by the long dashed line and the short dashed line. In the spherical aberration diagram, FNo. indicates an F number. In the other aberration diagrams, ω indicates a half angle of view.

Reference signs, meanings, description methods, illustration methods of the respective data pieces related to Example 1 are the same as those in the following examples unless otherwise noted. Therefore, in the following description, repeated description will be omitted.

Example 2

Figure 3:
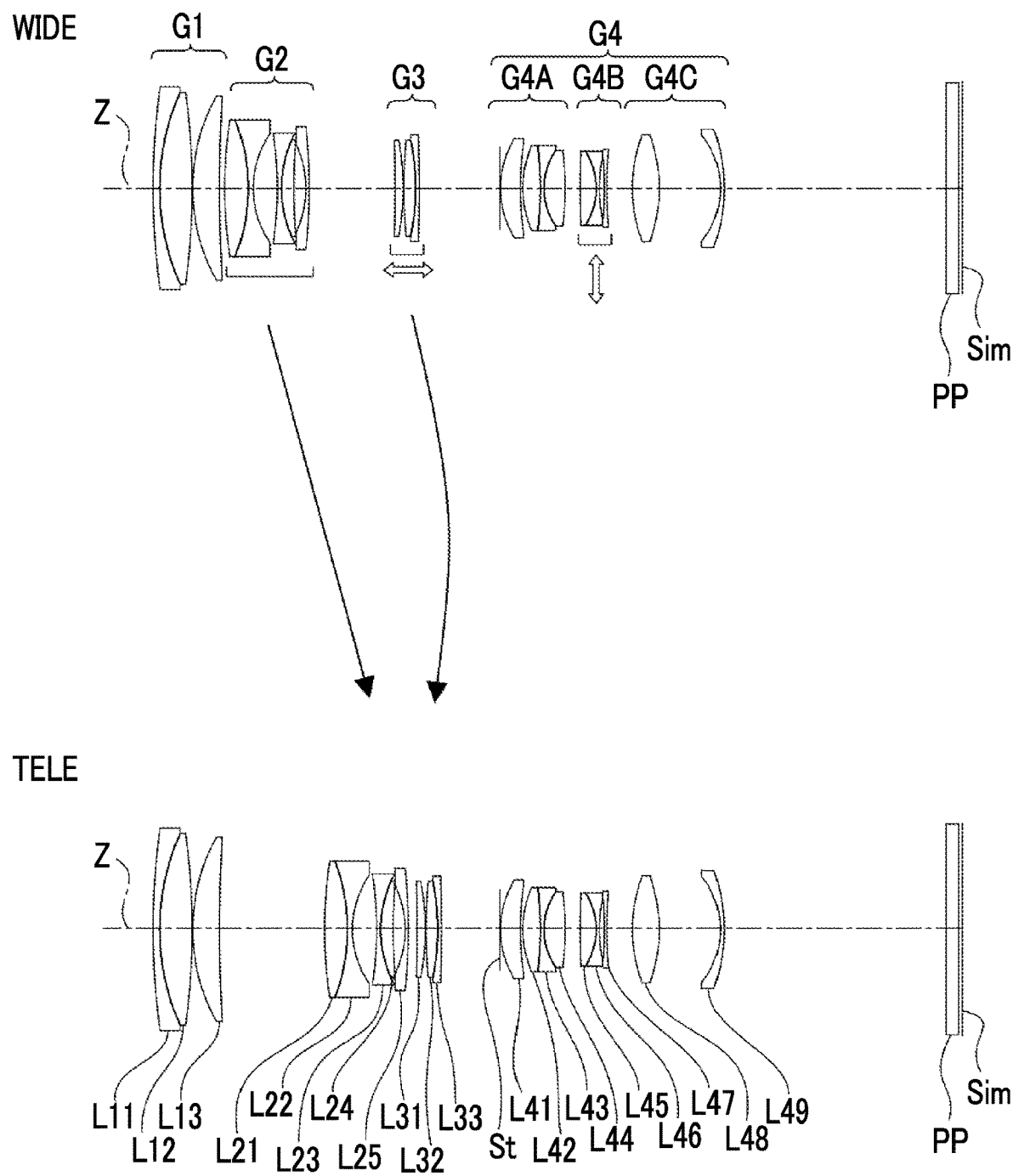
FIG. 3 is a diagram showing cross sections of configurations of a zoom lens according to Example 2 of the present invention at the wide-angle end and at the telephoto end and movement loci.
Figure 12:
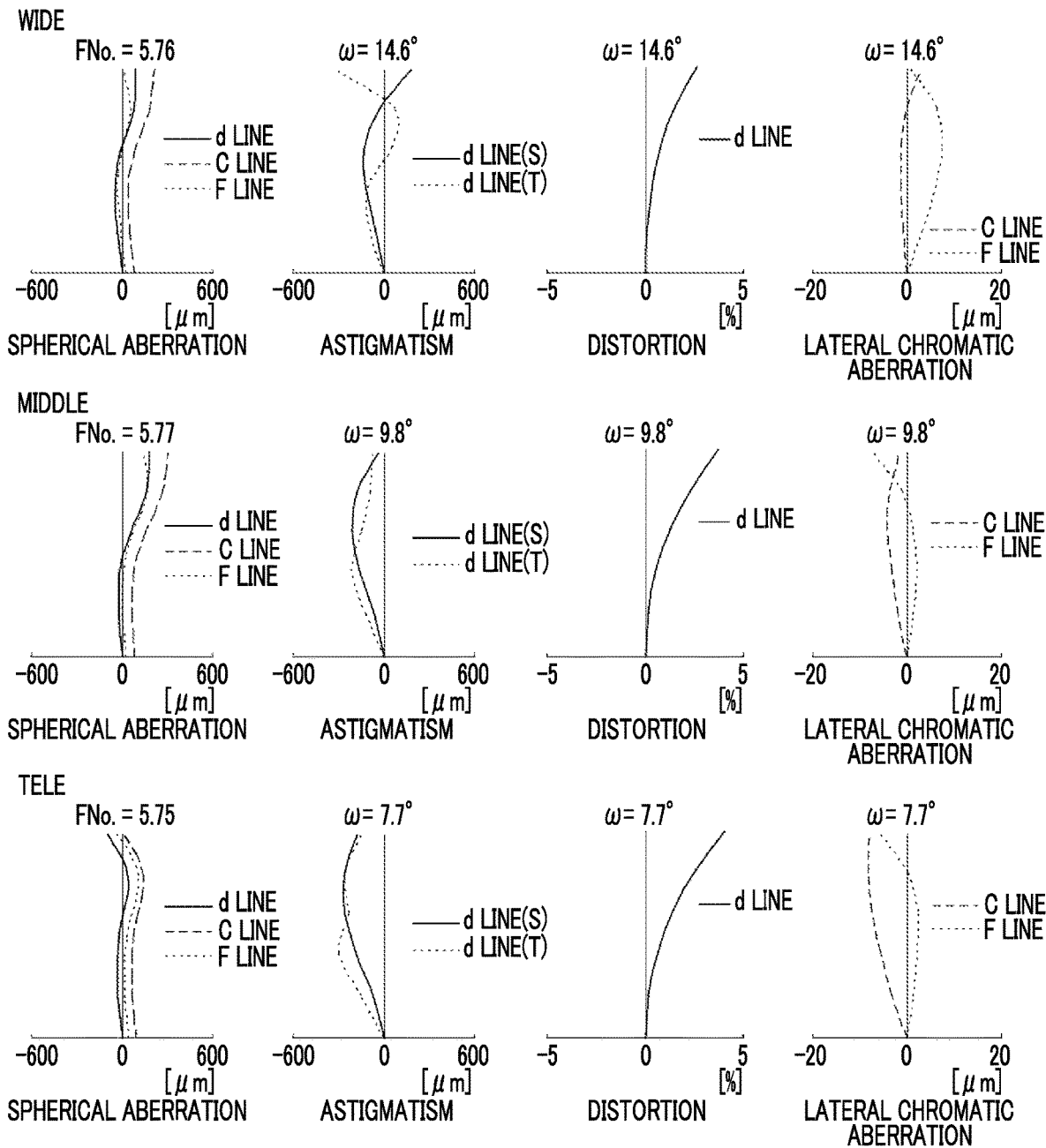
FIG. 12 shows aberration diagrams of the zoom lens according to Example 2 of the present invention.

FIG. 3 shows a cross-sectional view of a zoom lens according to Example 2. The zoom lens according to Example 2 has the same configuration as the outline of the zoom lens according to Example 1. Table 4 shows basic lens data of the zoom lens according to Example 2, Table 5 shows specifications and variable surface distances, Table 6 shows aspherical surface coefficients thereof, and FIG. 12 shows aberration diagrams in a state in which the object at infinity is in focus.

TABLE 4

Example 2

| Sn | R | D | Nd | νd |
|---|---|---|---|---|
| 1 | 206.0312 | 1.7300 | 1.80440 | 39.59 |
| 2 | 64.5418 | 8.6700 | 1.48749 | 70.24 |
| 3 | −189.6014 | 0.1050 | | |
| 4 | 52.3561 | 7.1663 | 1.43875 | 94.66 |
| 5 | 438.6302 | DD[5] | | |
| 6 | 125.5321 | 6.1000 | 1.83400 | 37.16 |
| 7 | −52.4682 | 1.3130 | 1.59551 | 39.24 |
| 8 | 26.4816 | 6.4133 | | |
| 9 | −101.6739 | 1.1073 | 1.48749 | 70.24 |
| 10 | 32.6627 | 3.3000 | 1.84666 | 23.78 |

TABLE 4-continued

Example 2

| Sn | R | D | Nd | vd |
|---|---|---|---|---|
| 11 | 152.8027 | 3.2000 | | |
| 12 | −28.2007 | 0.8400 | 1.56732 | 42.82 |
| 13 | −165.3877 | DD[13] | | |
| 14 | −438.8117 | 2.1400 | 1.92286 | 18.90 |
| 15 | −71.9223 | 0.2022 | | |
| 16 | 140.1901 | 3.1125 | 1.53996 | 59.46 |
| 17 | −66.1164 | 1.0185 | 1.95906 | 17.47 |
| 18 | −438.4278 | DD[18] | | |
| 19(St) | ∞ | 0.2001 | | |
| 20 | 26.4673 | 5.0500 | 1.43875 | 94.66 |
| 21 | 87.9611 | 0.6500 | | |
| 22 | 30.2652 | 4.6599 | 1.56883 | 56.36 |
| 23 | −94.3354 | 0.9400 | 1.83481 | 42.74 |
| 24 | 18.2307 | 5.6100 | 1.48749 | 70.24 |
| 25 | −95.1005 | 4.1010 | | |
| 26 | 438.9819 | 4.2003 | 1.64769 | 33.79 |
| 27 | −18.9242 | 0.8558 | 1.62041 | 60.29 |
| 28 | 41.1289 | 1.3425 | | |
| 29 | −96.4646 | 0.6300 | 1.85026 | 32.27 |
| 30 | 123.0729 | 6.7920 | | |
| *31 | 39.6084 | 7.2000 | 1.51760 | 63.50 |
| *32 | −41.2550 | 16.1428 | | |
| 33 | −23.4825 | 1.0000 | 1.48749 | 70.24 |
| 34 | −48.5094 | 58.9998 | | |
| 35 | ∞ | 3.2000 | 1.51680 | 64.20 |
| 36 | ∞ | 1.0187 | | |

TABLE 5

Example 2

| | WIDE | MIDDLE | TELE |
|---|---|---|---|
| Zr | 1.0 | 1.5 | 1.9 |
| f | 102.07 | 153.10 | 195.46 |
| Bf | 62.13 | 62.13 | 62.13 |
| FNo. | 5.76 | 5.77 | 5.75 |
| 2ω (°) | 29.2 | 19.6 | 15.4 |
| Y | 27.35 | 27.35 | 27.35 |
| DD[5] | 1.40 | 19.68 | 27.81 |
| DD[13] | 22.90 | 11.82 | 2.36 |
| DD[18] | 21.26 | 14.06 | 15.38 |

TABLE 6

Example 2

| Sn | 31 | 32 |
|---|---|---|
| KA | 2.8572951E+00 | 1.0000000E+00 |
| A3 | 0.0000000E+00 | 0.0000000E+00 |
| A4 | −7.9585494E−06 | −2.2962691E−06 |
| A5 | −1.4907830E−06 | 3.7895292E−07 |
| A6 | 4.2339317E−07 | −1.4303984E−07 |
| A7 | −2.7907051E−08 | 4.1518367E−08 |
| A8 | −6.5256123E−09 | −3.0542400E−09 |
| A9 | 8.8207849E−10 | −5.9220323E−10 |
| A10 | 5.2992577E−11 | 9.3418571E−11 |
| A11 | −1.2046097E−11 | 7.0556013E−13 |
| A12 | 5.9429815E−14 | −6.9115733E−13 |
| A13 | 6.2840752E−14 | 2.0418357E−14 |
| A14 | −1.8375504E−15 | 1.6275861E−15 |
| A15 | −1.1338095E−16 | −7.6808141E−17 |
| A16 | 4.8394490E−18 | 1.4659805E−19 |
| A17 | −1.7307582E−20 | −6.5322496E−21 |
| A18 | 5.4215077E−22 | 5.1939347E−22 |

Example 3

Figure 4:
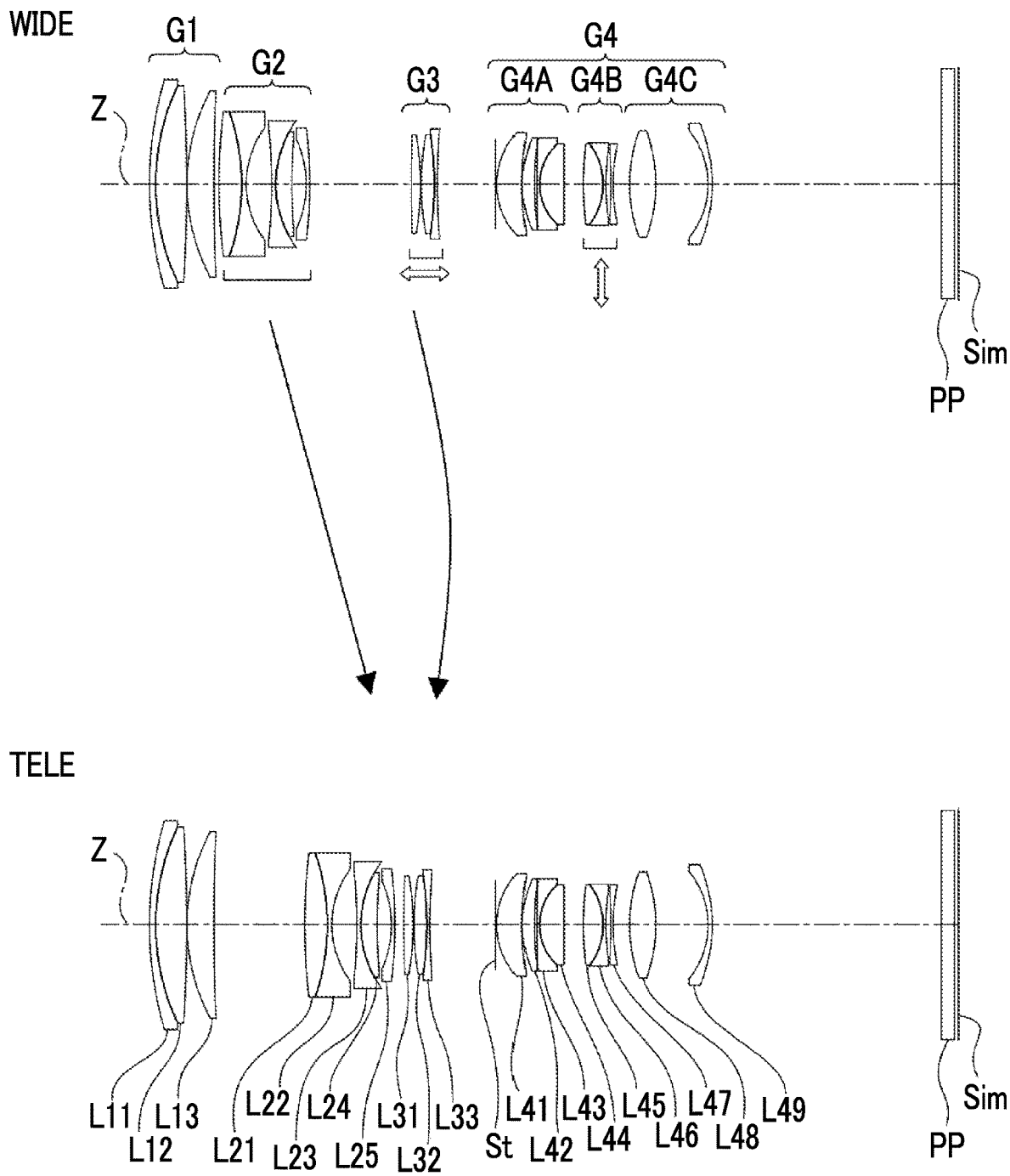
FIG. 4 is a diagram showing cross sections of configurations of a zoom lens according to Example 3 of the present invention at the wide-angle end and at the telephoto end and movement loci.

FIG. 4 shows a cross-sectional view of a zoom lens according to Example 3. The zoom lens according to Example 3 has the same configuration as the outline of the zoom lens according to Example 1. Table 7 shows basic lens data of the zoom lens according to Example 3, Table 8 shows specifications and variable surface distances, Table 9 shows aspherical surface coefficients thereof, and FIG. 13 shows aberration diagrams in a state in which the object at infinity is in focus.

TABLE 7

Example 3

| Sn | R | D | Nd | vd |
|---|---|---|---|---|
| 1 | 95.8418 | 1.5000 | 1.91300 | 30.83 |
| 2 | 58.4465 | 7.5597 | 1.49700 | 81.54 |
| 3 | −423.2171 | 0.1000 | | |
| 4 | 50.3328 | 6.5783 | 1.43875 | 94.66 |
| 5 | 565.4497 | DD[5] | | |
| 6 | 160.0823 | 5.5330 | 1.80100 | 34.97 |
| 7 | −55.1323 | 1.1100 | 1.58144 | 40.75 |
| 8 | 24.0950 | 6.1079 | | |
| 9 | −134.5878 | 1.0099 | 1.56657 | 60.55 |
| 10 | 27.4145 | 3.9511 | 1.84133 | 22.93 |
| 11 | 137.4503 | 3.5084 | | |
| 12 | −26.7411 | 0.8301 | 1.59551 | 39.24 |
| 13 | −118.9787 | DD[13] | | |
| 14 | 519.7815 | 2.2500 | 1.92286 | 18.90 |
| 15 | −72.2665 | 0.1926 | | |
| 16 | 70.5332 | 3.1599 | 1.60300 | 65.44 |
| 17 | −81.3097 | 0.7499 | 1.95906 | 17.47 |
| 18 | 168.5042 | DD[18] | | |
| 19(St) | ∞ | 0.1999 | | |
| 20 | 19.4009 | 5.8833 | 1.43875 | 94.66 |
| 21 | 66.6627 | 0.1500 | | |
| 22 | 28.8353 | 2.9488 | 1.48749 | 70.24 |
| 23 | 90.9413 | 0.5499 | | |
| 24 | 278.5018 | 0.6200 | 1.81600 | 46.62 |
| 25 | 13.6985 | 6.0101 | 1.48749 | 70.24 |
| 26 | −1313.8173 | 4.7420 | | |
| 27 | 83.3271 | 4.7840 | 1.64769 | 33.79 |
| 28 | −17.1211 | 0.6499 | 1.61800 | 63.33 |
| 29 | 55.3471 | 1.2499 | | |
| 30 | −175.8252 | 0.6099 | 1.91082 | 35.25 |
| 31 | 50.6404 | 3.9999 | | |
| *32 | 37.6045 | 6.3799 | 1.51633 | 64.06 |
| *33 | −41.8580 | 12.8419 | | |
| 34 | −21.2762 | 1.0000 | 1.48749 | 70.24 |
| 35 | −38.8668 | 55.9240 | | |
| 36 | ∞ | 3.2000 | 1.51680 | 64.20 |
| 37 | ∞ | 1.0240 | | |

TABLE 8

Example 3

| | WIDE | MIDDLE | TELE |
|---|---|---|---|
| Zr | 1.0 | 1.5 | 2.1 |
| f | 102.58 | 153.88 | 215.43 |
| Bf | 59.06 | 59.06 | 59.06 |
| FNo. | 5.77 | 5.78 | 5.76 |
| 2ω (°) | 29.0 | 19.4 | 13.8 |
| Y | 27.35 | 27.35 | 27.35 |
| DD[5] | 1.25 | 14.60 | 22.10 |
| DD[13] | 24.88 | 14.48 | 2.20 |
| DD[18] | 14.30 | 11.35 | 16.13 |

TABLE 9

| | Example 3 | |
|---|---|---|
| Sn | 32 | 33 |
| KA | 1.0000000E+00 | 1.0000000E+00 |
| A3 | 0.0000000E+00 | 0.0000000E+00 |
| A4 | −9.5965869E−06 | −5.3359113E−06 |
| A5 | −3.9158231E−07 | 2.6068664E−07 |
| A6 | 2.5973755E−07 | −1.6629191E−07 |
| A7 | −1.5532018E−08 | 5.450805 1E−08 |
| A8 | −8.6943821E−09 | −4.5182225E−09 |
| A9 | 1.2371662E−09 | −8.7456895E−10 |
| A10 | 7.2668324E−11 | 1.5149911E−10 |
| A11 | −1.9455019E−11 | 1.1659501E−12 |
| A12 | 1.5426158E−13 | −1.2267072E−12 |
| A13 | 1.1725233E−13 | 2.9529592E−14 |
| A14 | −3.5958939E−15 | 3.7390360E−15 |
| A15 | −2.7642159E−16 | −1.2392299E−16 |
| A16 | 1.2171250E−17 | −2.0504339E−18 |

Example 4

Figure 5:
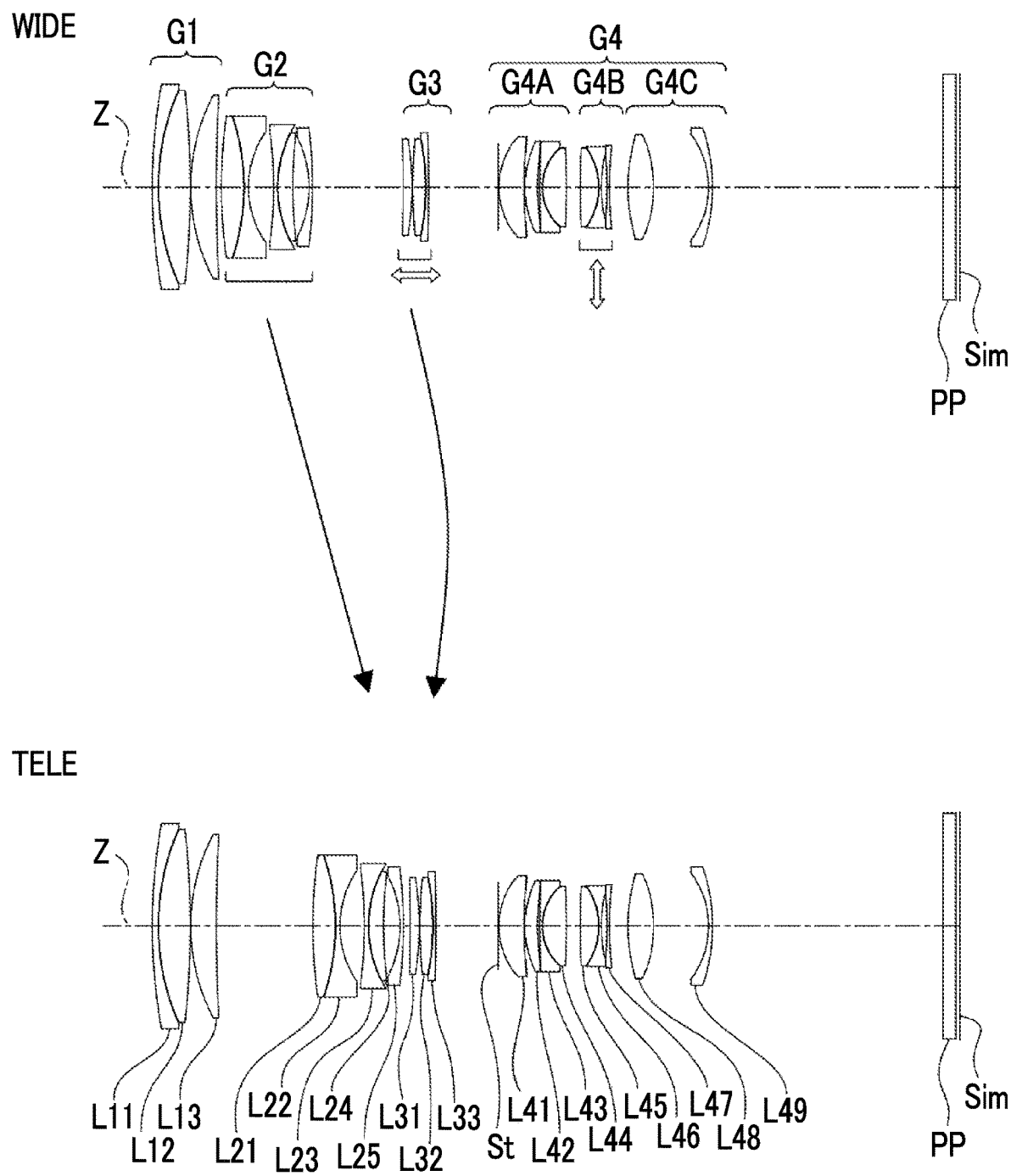
FIG. 5 is a diagram showing cross sections of configurations of a zoom lens according to Example 4 of the present invention at the wide-angle end and at the telephoto end and movement loci.
Figure 14:
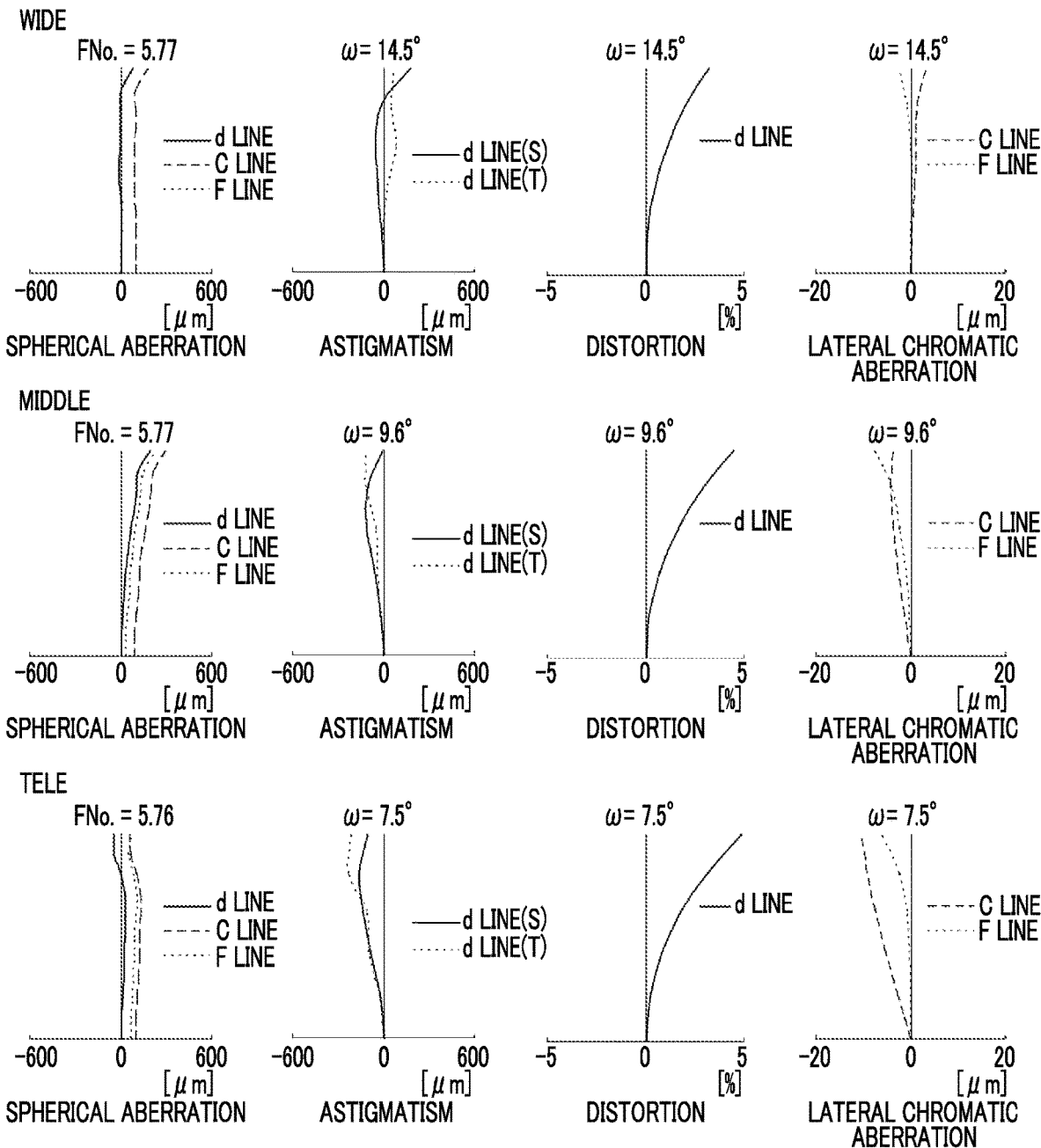
FIG. 14 shows aberration diagrams of the zoom lens according to Example 4 of the present invention.

FIG. 5 shows a cross-sectional view of a zoom lens according to Example 4. The zoom lens according to Example 4 has the same configuration as the outline of the zoom lens according to Example 1. Table 10 shows basic lens data of the zoom lens according to Example 4, Table 11 shows specifications and variable surface distances, Table 12 shows aspherical surface coefficients thereof, and FIG. 14 shows aberration diagrams in a state in which the object at infinity is in focus.

TABLE 10

| | Example 4 | | | |
|---|---|---|---|---|
| Sn | R | D | Nd | νd |
| 1 | 150.3131 | 1.5000 | 1.80100 | 34.97 |
| 2 | 62.0914 | 7.9345 | 1.48749 | 70.24 |
| 3 | −220.8321 | 0.1000 | | |
| 4 | 50.8181 | 6.3705 | 1.43875 | 94.66 |
| 5 | 438.6627 | DD[5] | | |
| 6 | 126.6110 | 5.6377 | 1.80100 | 34.97 |
| 7 | −57.3660 | 1.1100 | 1.58144 | 40.75 |
| 8 | 25.2403 | 6.1079 | | |
| 9 | −109.6474 | 1.0100 | 1.48749 | 70.24 |
| 10 | 30.8110 | 3.7652 | 1.84666 | 23.78 |
| 11 | 113.9895 | 4.0659 | | |
| 12 | −28.4955 | 0.8299 | 1.59551 | 39.24 |
| 13 | −125.5096 | DD[13] | | |
| 14 | −438.7696 | 2.2499 | 1.92286 | 18.90 |
| 15 | −71.9254 | 0.1926 | | |
| 16 | 133.3050 | 3.1600 | 1.60300 | 65.44 |
| 17 | −63.6204 | 0.7499 | 1.95906 | 17.47 |
| 18 | −438.5035 | DD[18] | | |
| 19(St) | ∞ | 0.1999 | | |
| 20 | 20.0112 | 5.9999 | 1.43875 | 94.66 |
| 21 | 124.1076 | 0.1500 | | |
| 22 | 27.3433 | 3.1138 | 1.48749 | 70.24 |
| 23 | 69.6005 | 0.5501 | | |
| 24 | 374.5844 | 0.6200 | 1.81600 | 46.62 |
| 25 | 13.6986 | 6.0101 | 1.48749 | 70.24 |
| 26 | −182.8772 | 3.3952 | | |
| 27 | 216.4800 | 4.6318 | 1.64769 | 33.79 |
| 28 | −17.7709 | 0.6499 | 1.61800 | 63.33 |
| 29 | 37.3994 | 1.3784 | | |
| 30 | −114.4399 | 0.6099 | 1.91082 | 35.25 |
| 31 | 101.9416 | 4.5805 | | |
| *32 | 40.1053 | 6.4182 | 1.51633 | 64.06 |
| *33 | −34.7211 | 13.6568 | | |
| 34 | −22.7269 | 1.0000 | 1.48749 | 70.24 |
| 35 | −46.5944 | 57.2033 | | |

TABLE 10-continued

| | Example 4 | | | |
|---|---|---|---|---|
| Sn | R | D | Nd | νd |
| 36 | ∞ | 3.2000 | 1.51680 | 64.20 |
| 37 | ∞ | 1.0205 | | |

TABLE 11

| | Example 4 | | |
|---|---|---|---|
| | WIDE | MIDDLE | TELE |
| Zr | 1.0 | 1.5 | 1.9 |
| f | 102.61 | 153.92 | 197.02 |
| Bf | 60.33 | 60.33 | 60.33 |
| FNo. | 5.77 | 5.77 | 5.76 |
| 2ω (°) | 29.0 | 19.2 | 15.0 |
| Y | 27.35 | 27.35 | 27.35 |
| DD[5] | 1.25 | 16.98 | 23.86 |
| DD[13] | 22.56 | 11.25 | 1.74 |
| DD[18] | 17.30 | 12.89 | 15.51 |

TABLE 12

| | Example 4 | |
|---|---|---|
| Sn | 32 | 33 |
| KA | 1.0000000E+00 | 1.0000000E+00 |
| A3 | 0.0000000E+00 | 0.0000000E+00 |
| A4 | −1.1374505E−05 | −5.9624883E−06 |
| A5 | −5.3177421E−07 | 3.4460028E−07 |
| A6 | 2.5562654E−07 | −1.9099543E−07 |
| A7 | −1.5695954E−08 | 5.4244845E−08 |
| A8 | −8.6542474E−09 | −4.5006268E−09 |
| A9 | 1.2334817E−09 | −8.4372668E−10 |
| A10 | 7.4912512E−11 | 1.4844294E−10 |
| A11 | −1.9856826E−11 | 1.0739126E−12 |
| A12 | 1.5462272E−13 | −1.2221898E−12 |
| A13 | 1.1844460E−13 | 3.0158077E−14 |
| A14 | −3.6329550E−15 | 3.7417264E−15 |
| A15 | −2.5709250E−16 | −1.2076670E−16 |
| A16 | 1.0780166E−17 | −2.4867825E−18 |

Example 5

Figure 6:
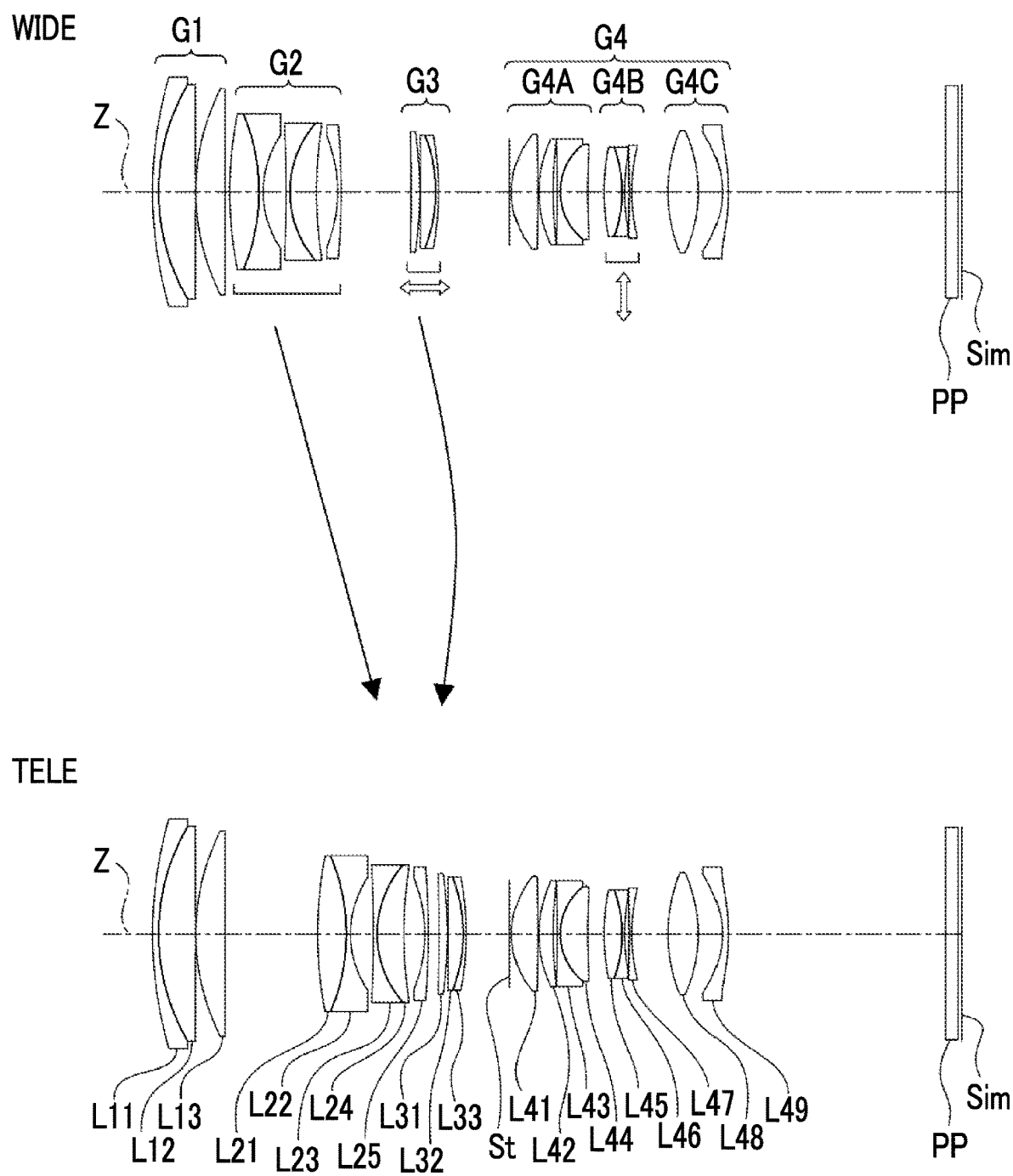
FIG. 6 is a diagram showing cross sections of configurations of a zoom lens according to Example 5 of the present invention at the wide-angle end and at the telephoto end and movement loci.
Figure 15:
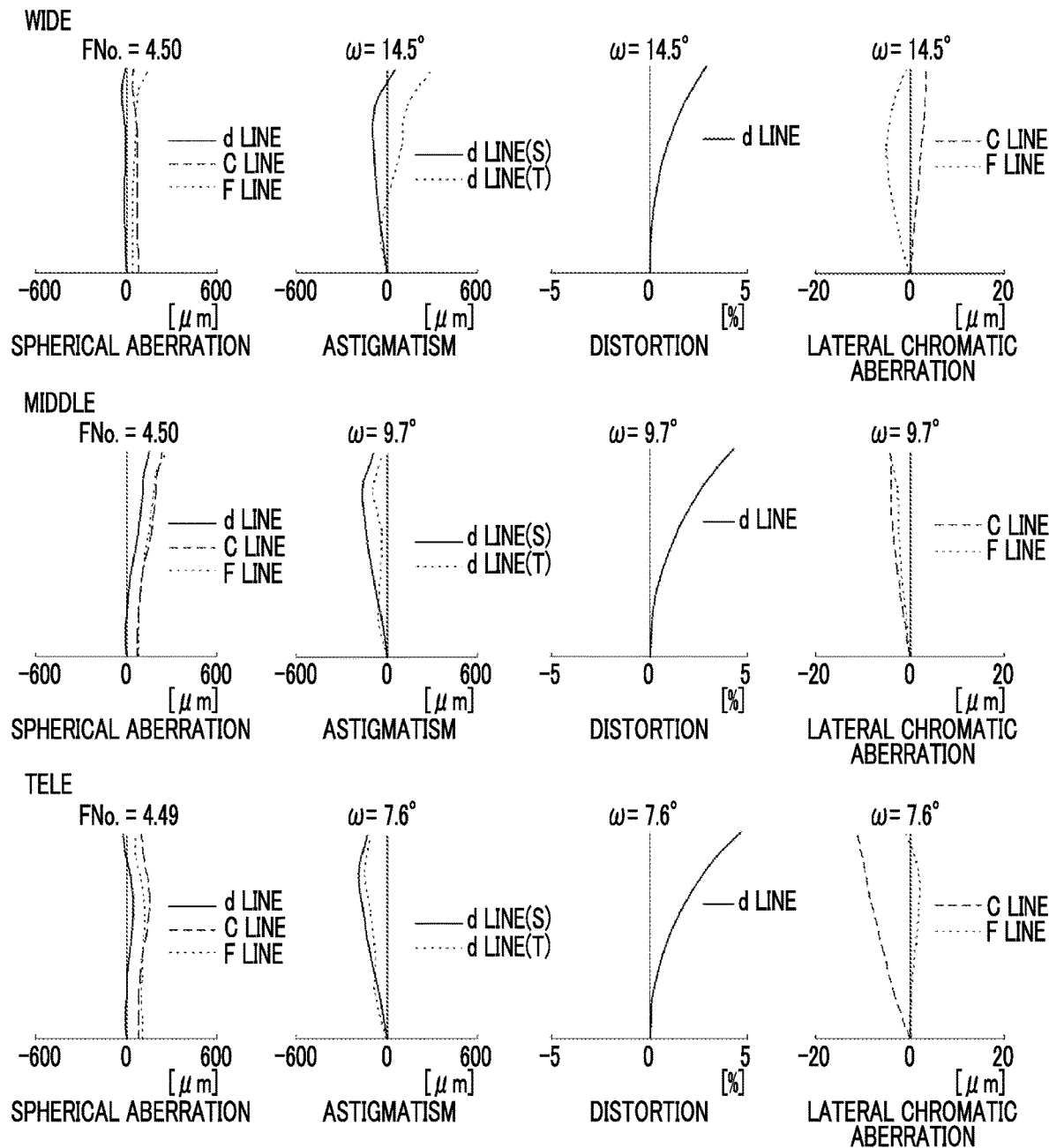
FIG. 15 shows aberration diagrams of the zoom lens according to Example 5 of the present invention.

FIG. 6 shows a cross-sectional view of a zoom lens according to Example 5. The zoom lens according to Example 5 has the same configuration as the outline of the zoom lens according to Example 1. Table 13 shows basic lens data of the zoom lens according to Example 5, Table 14 shows specifications and variable surface distances, Table 15 shows aspherical surface coefficients thereof, and FIG. 15 shows aberration diagrams in a state in which the object at infinity is in focus.

TABLE 13

| | Example 5 | | | |
|---|---|---|---|---|
| Sn | R | D | Nd | νd |
| 1 | 113.6839 | 1.5700 | 1.80100 | 34.97 |
| 2 | 58.2421 | 9.7990 | 1.49700 | 81.54 |
| 3 | −4987.9815 | 0.1000 | | |
| 4 | 62.6936 | 7.7148 | 1.49700 | 81.54 |
| 5 | −9825.6665 | DD[5] | | |
| 6 | 108.9096 | 7.6001 | 1.80100 | 34.97 |

TABLE 13-continued

Example 5

| Sn | R | D | Nd | vd |
|---|---|---|---|---|
| 7 | −55.2416 | 1.1193 | 1.74320 | 49.34 |
| 8 | 27.7422 | 6.0621 | | |
| 9 | −357.1429 | 1.0193 | 1.49700 | 81.54 |
| 10 | 28.6979 | 7.0001 | 1.90366 | 31.31 |
| 11 | 112.8186 | 5.5898 | | |
| 12 | −40.8315 | 0.9400 | 1.91082 | 35.25 |
| 13 | −221.9512 | DD[13] | | |
| 14 | −902.3541 | 2.3000 | 1.95906 | 17.47 |
| 15 | −113.0928 | 0.1926 | | |
| 16 | −2440.3427 | 3.9679 | 1.65160 | 58.55 |
| 17 | −42.9882 | 0.8001 | 1.95906 | 17.47 |
| 18 | −81.2448 | DD[18] | | |
| 19(St) | ∞ | 0.5000 | | |
| 20 | 25.0349 | 6.8234 | 1.43875 | 94.66 |
| 21 | −645.0842 | 0.2889 | | |
| 22 | 34.0639 | 3.7209 | 1.60300 | 65.44 |
| 23 | 111.6012 | 1.0306 | | |
| 24 | −445.2607 | 0.8865 | 1.80400 | 46.58 |
| 25 | 16.6133 | 7.2904 | 1.49700 | 81.54 |
| 26 | 218.8461 | 4.3000 | | |
| 27 | 61.8046 | 4.7390 | 1.85896 | 22.73 |
| 28 | −36.6671 | 0.6992 | 1.74100 | 52.64 |
| 29 | 53.6615 | 1.2004 | | |
| 30 | −331.0413 | 0.6799 | 1.95906 | 17.47 |
| 31 | 50.3116 | 9.5643 | | |
| 32 | 43.8009 | 8.0493 | 1.60342 | 38.03 |
| 33 | −40.8786 | 6.3553 | | |
| *34 | −24.2399 | 1.5000 | 1.80139 | 45.45 |
| *35 | −57.1170 | 57.4336 | | |
| 36 | ∞ | 3.2000 | 1.51680 | 64.20 |
| 37 | ∞ | 1.0690 | | |

TABLE 14

Example 5

| | WIDE | MIDDLE | TELE |
|---|---|---|---|
| Zr | 1.0 | 1.5 | 1.9 |
| f | 102.69 | 154.03 | 195.11 |
| Bf | 60.61 | 60.61 | 60.61 |
| FNo. | 4.50 | 4.50 | 4.49 |
| 2ω (°) | 29.0 | 19.4 | 15.2 |
| Y | 27.35 | 27.35 | 27.35 |
| DD[5] | 1.25 | 17.35 | 24.36 |
| DD[13] | 18.56 | 9.94 | 2.78 |
| DD[18] | 18.60 | 11.13 | 11.28 |

TABLE 15

Example 5

| Sn | 34 | 35 |
|---|---|---|
| KA | 1.0000000E+00 | 1.0000000E+00 |
| A3 | 0.0000000E+00 | 0.0000000E+00 |
| A4 | 2.1954539E−06 | 1.3463850E−06 |
| A5 | 1.1109228E−07 | 3.5073631E−07 |
| A6 | 4.2879779E−08 | 3.4558044E−08 |
| A7 | 3.3513773E−09 | −2.0582225E−09 |
| A8 | −2.9918344E−10 | 8.8291486E−11 |
| A9 | 7.5760478E−13 | 4.8352673E−12 |
| A10 | 9.2080981E−15 | −1.0842352E−12 |
| A11 | 4.4439769E−15 | 2.7277454E−14 |
| A12 | 6.0010238E−16 | 5.8234863E−16 |

Example 6

Figure 7:
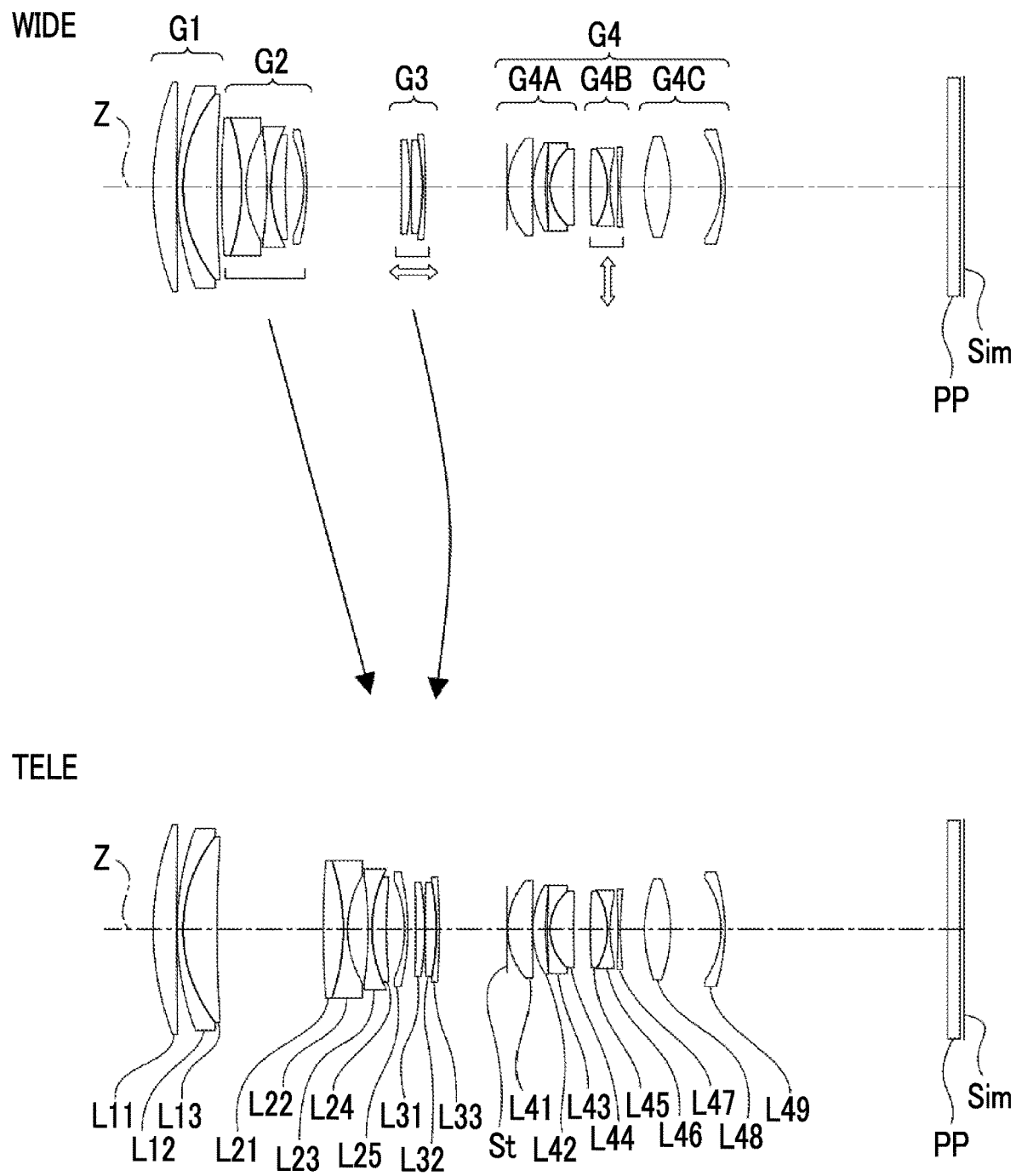
FIG. 7 is a diagram showing cross sections of configurations of a zoom lens according to Example 6 of the present invention at the wide-angle end and at the telephoto end and movement loci.
Figure 16:
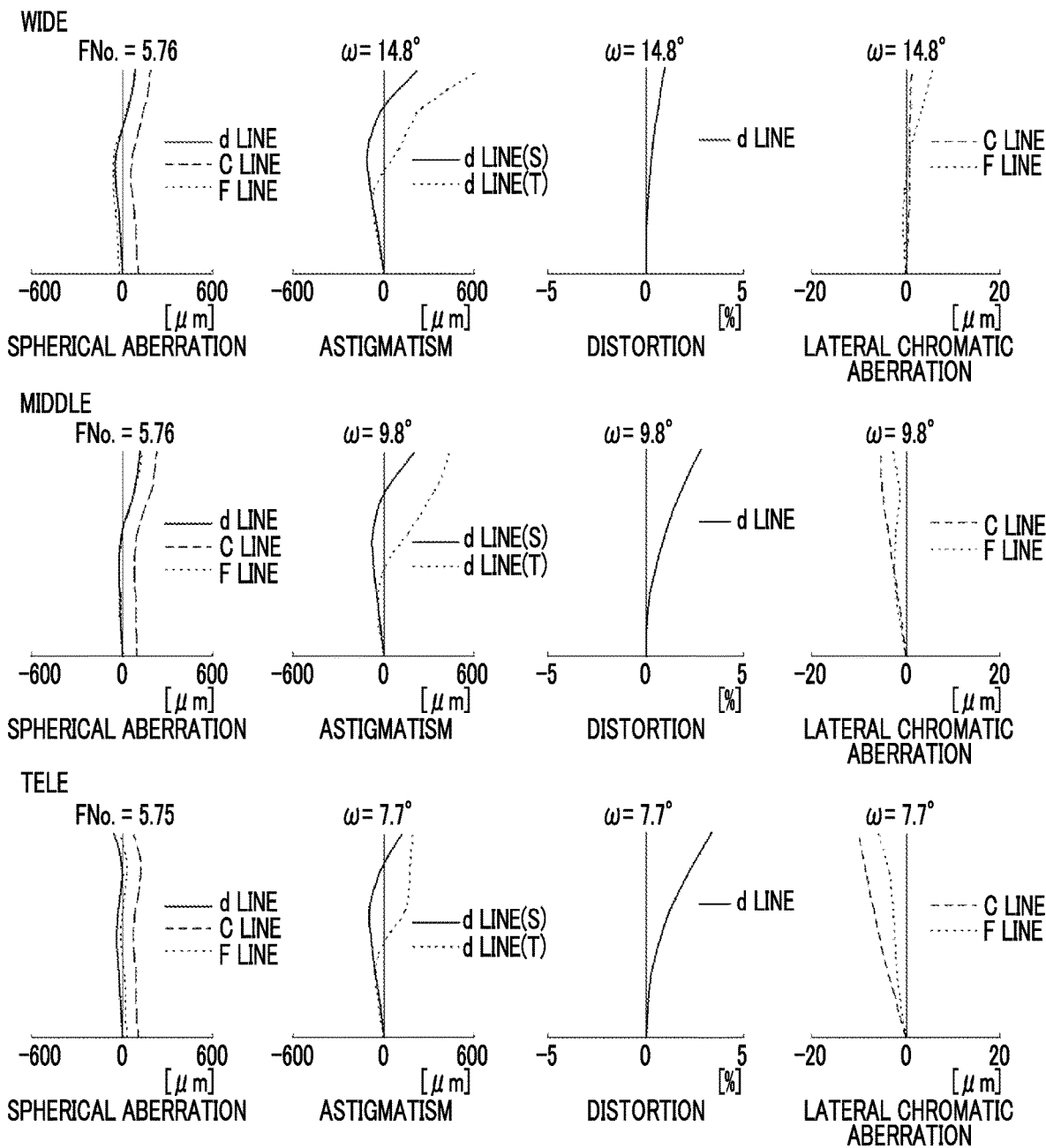
FIG. 16 shows aberration diagrams of the zoom lens according to Example 6 of the present invention.

FIG. 7 shows a cross-sectional view of a zoom lens according to Example 6. The zoom lens according to Example 6 has the same configuration as the outline of the zoom lens according to Example 1. Table 16 shows basic lens data of the zoom lens according to Example 6, Table 17 shows specifications and variable surface distances, Table 18 shows aspherical surface coefficients thereof, and FIG. 16 shows aberration diagrams in a state in which the object at infinity is in focus.

TABLE 16

Example 6

| Sn | R | D | Nd | vd |
|---|---|---|---|---|
| 1 | 79.0533 | 5.9917 | 1.43875 | 94.66 |
| 2 | 2287.7954 | 0.1000 | | |
| 3 | 76.8989 | 1.5200 | 1.62313 | 35.69 |
| 4 | 39.9986 | 8.7221 | 1.48749 | 70.24 |
| 5 | 353.7822 | DD[5] | | |
| 6 | 234.9973 | 5.1554 | 1.80100 | 34.97 |
| 7 | −56.6330 | 1.1100 | 1.58144 | 40.75 |
| 8 | 27.9568 | 5.2583 | | |
| 9 | −100.2389 | 1.0100 | 1.48749 | 70.24 |
| 10 | 35.7441 | 3.7000 | 1.87720 | 26.23 |
| 11 | 141.0270 | 4.6859 | | |
| 12 | −32.0630 | 0.8299 | 1.76941 | 51.06 |
| 13 | −63.8828 | DD[13] | | |
| 14 | −453.2046 | 2.2499 | 1.92286 | 18.90 |
| 15 | −85.3378 | 0.1926 | | |
| 16 | 434.8843 | 2.9099 | 1.60300 | 65.44 |
| 17 | −64.4287 | 0.7499 | 1.95906 | 17.47 |
| 18 | −201.9751 | DD[18] | | |
| 19(St) | ∞ | 0.2000 | | |
| 20 | 21.1680 | 5.8999 | 1.43875 | 94.66 |
| 21 | 542.2095 | 0.1500 | | |
| 22 | 23.6461 | 3.2999 | 1.48749 | 70.24 |
| 23 | 68.5093 | 0.5499 | | |
| 24 | 283.2470 | 0.6200 | 1.81600 | 46.62 |
| 25 | 13.6985 | 6.0101 | 1.48749 | 70.24 |
| 26 | 215.9297 | 4.3001 | | |
| 27 | 195.4255 | 4.4001 | 1.64769 | 33.79 |
| 28 | −19.3651 | 0.6499 | 1.61800 | 63.33 |
| 29 | 35.1084 | 2.1001 | | |
| 30 | −129.1386 | 0.6099 | 1.91082 | 35.25 |
| 31 | 100.0070 | 6.1884 | | |
| *32 | 35.6112 | 6.6410 | 1.51633 | 64.06 |
| *33 | −39.2169 | 12.9832 | | |
| 34 | −23.5969 | 1.0000 | 1.48749 | 70.24 |
| 35 | −50.9150 | 57.0994 | | |
| 36 | ∞ | 3.2000 | 1.51680 | 64.20 |
| 37 | ∞ | 1.0476 | | |

TABLE 17

Example 6

| | WIDE | MIDDLE | TELE |
|---|---|---|---|
| Zr | 1.0 | 1.5 | 1.9 |
| f | 102.52 | 153.78 | 194.78 |
| Bf | 60.26 | 60.26 | 60.26 |
| FNo. | 5.76 | 5.76 | 5.75 |
| 2ω (°) | 29.6 | 19.6 | 15.4 |
| Y | 27.35 | 27.35 | 27.35 |
| DD[5] | 1.20 | 19.32 | 27.17 |
| DD[13] | 24.36 | 12.11 | 1.99 |
| DD[18] | 21.00 | 15.13 | 17.41 |

TABLE 18

Example 6

| Sn | 32 | 33 |
|---|---|---|
| KA | 1.0000000E+00 | 1.0000000E+00 |
| A3 | 0.0000000E+00 | 0.0000000E+00 |

TABLE 18-continued

Example 6

| Sn | 32 | 33 |
|---|---|---|
| A4 | -8.4768956E-06 | -4.1961367E-06 |
| A5 | -1.2642390E-06 | 5.6648061E-07 |
| A6 | 4.1390696E-07 | -2.4534523E-07 |
| A7 | -2.5930734E-08 | 6.0813017E-08 |
| A8 | -9.0983594E-09 | -4.0594202E-09 |
| A9 | 1.2342334E-09 | -8.8637154E-10 |
| A10 | 7.5831031E-11 | 1.3962742E-10 |
| A11 | -1.8348677E-11 | 8.7161020E-13 |
| A12 | 1.0992864E-13 | -1.1237653E-12 |
| A13 | 1.1237595E-13 | 3.7149899E-14 |
| A14 | -4.8104641E-15 | 3.6600925E-15 |
| A15 | -1.0156062E-16 | -2.6171352E-16 |
| A16 | 6.6677311E-18 | 4.5430182E-18 |

Example 7

Figure 17:
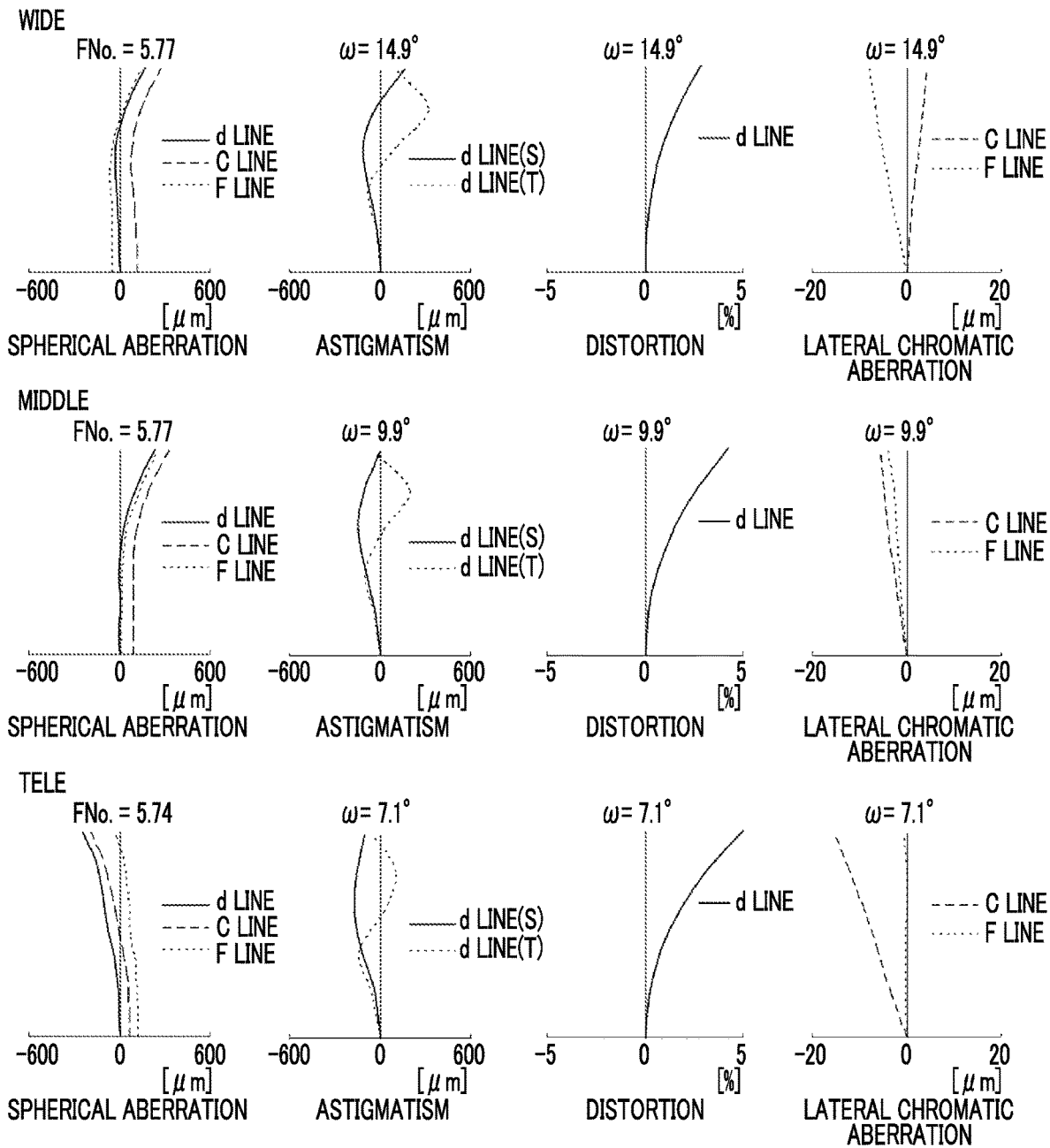
FIG. 17 shows aberration diagrams of the zoom lens according to Example 7 of the present invention.

FIG. 8 shows a cross-sectional view of a zoom lens according to Example 7. The zoom lens according to Example 7 has the same configuration as the outline of the zoom lens according to Example 1. Table 19 shows basic lens data of the zoom lens according to Example 7, Table 20 shows specifications and variable surface distances, Table 21 shows aspherical surface coefficients thereof, and FIG. 17 shows aberration diagrams in a state in which the object at infinity is in focus.

TABLE 19

Example 7

| Sn | R | D | Nd | vd |
|---|---|---|---|---|
| 1 | 97.1517 | 1.4999 | 1.93279 | 34.72 |
| 2 | 57.3057 | 6.7131 | 1.49700 | 81.54 |
| 3 | -765.1238 | 0.1000 | | |
| 4 | 48.5409 | 6.5178 | 1.43875 | 94.66 |
| 5 | 538.4332 | DD[5] | | |
| 6 | 140.8064 | 4.5295 | 1.80100 | 34.97 |
| 7 | -56.5642 | 1.1100 | 1.58144 | 40.75 |
| 8 | 24.4658 | 6.1079 | | |
| 9 | -90.9390 | 1.1101 | 1.48749 | 70.24 |
| 10 | 29.4669 | 3.3999 | 1.84666 | 23.78 |
| 11 | 138.9307 | 4.6001 | | |
| 12 | -27.8785 | 0.8299 | 1.59551 | 39.24 |
| 13 | -324.1009 | DD[13] | | |
| 14 | 580.8065 | 2.4499 | 1.92286 | 18.90 |
| 15 | -57.2403 | 0.1926 | | |
| 16 | 52.8581 | 3.4599 | 1.60300 | 65.44 |
| 17 | -58.4096 | 0.7499 | 1.95906 | 17.47 |
| 18 | 145.8288 | DD[18] | | |
| 19(St) | ∞ | 0.1999 | | |
| 20 | 20.4078 | 6.0001 | 1.49700 | 81.54 |
| 21 | -124.9852 | 0.1500 | | |
| 22 | 333.4334 | 3.0099 | 1.48749 | 70.24 |
| 23 | -48.2954 | 0.6200 | 1.78475 | 51.90 |
| 24 | 14.6029 | 5.4561 | 1.48749 | 70.24 |
| 25 | -443.2618 | 3.4940 | | |
| 26 | 92.1986 | 4.0000 | 1.64769 | 33.79 |
| 27 | -16.9618 | 0.7101 | 1.61800 | 63.33 |
| 28 | 41.8629 | 2.0001 | | |
| 29 | -434.9528 | 0.6099 | 1.91082 | 35.25 |
| 30 | 62.4967 | 4.0459 | | |
| *31 | 42.4360 | 6.3799 | 1.51633 | 64.06 |
| *32 | -47.1998 | 14.3001 | | |
| 33 | -26.2952 | 1.0000 | 1.48749 | 70.24 |
| 34 | -49.1553 | 48.9234 | | |
| 35 | ∞ | 3.2000 | 1.51680 | 64.20 |
| 36 | ∞ | 1.0094 | | |

TABLE 20

Example 7

| | WIDE | MIDDLE | TELE |
|---|---|---|---|
| Zr | 1.0 | 1.5 | 2.1 |
| f | 99.69 | 149.54 | 209.36 |
| Bf | 52.04 | 52.04 | 52.04 |
| FNo. | 5.77 | 5.77 | 5.74 |
| 2ω (°) | 29.8 | 19.8 | 14.2 |
| Y | 27.35 | 27.35 | 27.35 |
| DD[5] | 1.25 | 17.13 | 25.25 |
| DD[13] | 21.72 | 12.48 | 1.79 |
| DD[18] | 17.30 | 10.66 | 13.23 |

TABLE 21

Example 7

| Sn | 31 | 32 |
|---|---|---|
| KA | 1.0000000E+00 | 1.0000000E+00 |
| A3 | 0.0000000E+00 | 0.0000000E+00 |
| A4 | -7.2891390E-06 | -4.2750585E-06 |
| A5 | -5.5172509E-07 | 2.2949235E-07 |
| A6 | 2.2452804E-07 | -1.7933828E-07 |
| A7 | -1.1808333E-08 | 5.4603499E-08 |
| A8 | -8.7637007E-09 | -3.9499724E-09 |
| A9 | 1.2614587E-09 | -9.2619750E-10 |
| A10 | 7.1603755E-11 | 1.5123134E-10 |
| A11 | -2.0219986E-11 | 8.9856947E-13 |
| A12 | 1.5224996E-13 | -1.2034052E-12 |
| A13 | 1.2476266E-13 | 3.0266582E-14 |
| A14 | -3.7116058E-15 | 3.7062197E-15 |
| A15 | -2.8354186E-16 | -1.1951128E-16 |
| A16 | 1.1552206E-17 | -2.6281960E-18 |

Example 8

Figure 18:
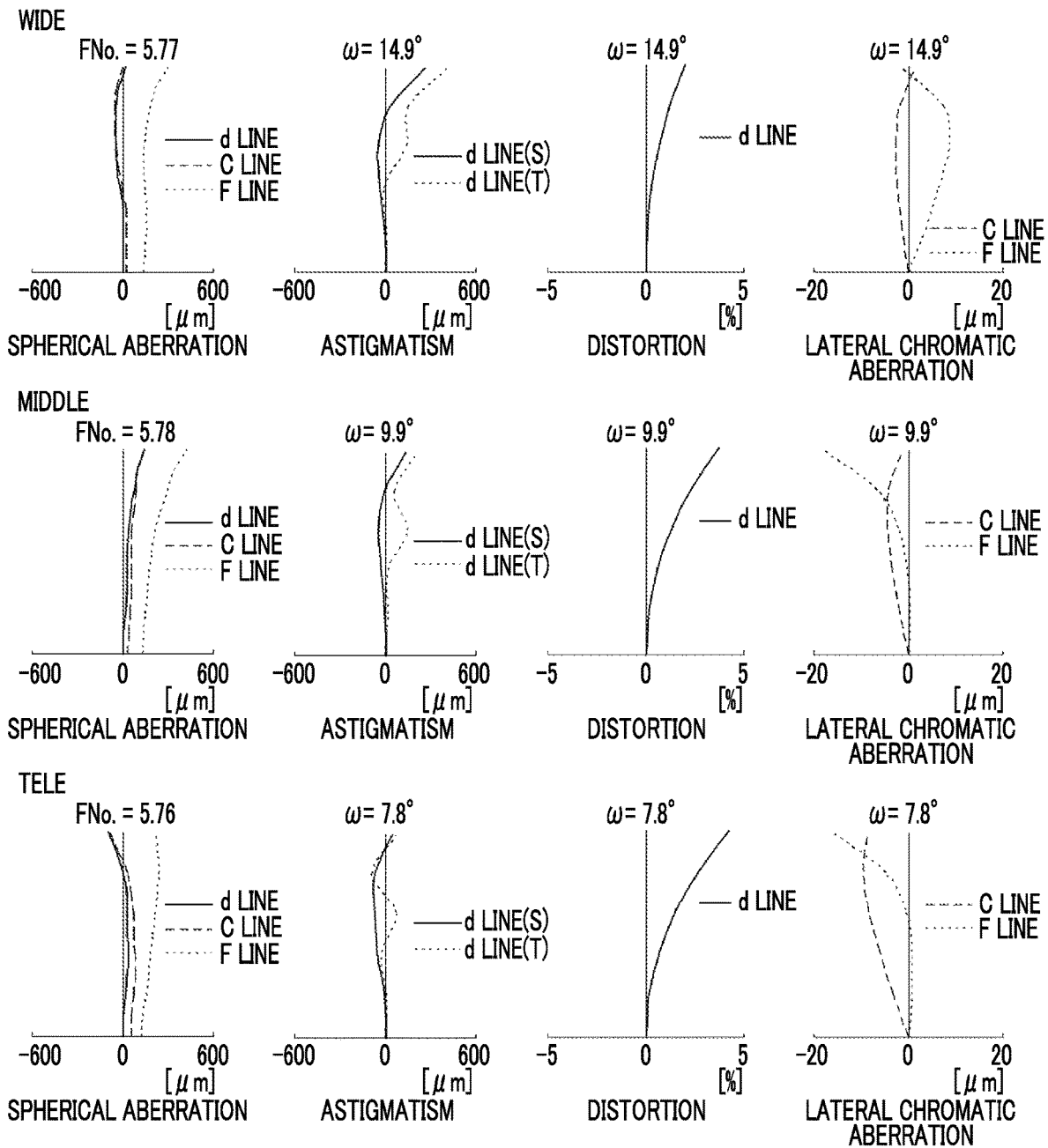
FIG. 18 shows aberration diagrams of the zoom lens according to Example 8 of the present invention.

FIG. 9 shows a cross-sectional view of a zoom lens according to Example 8. The zoom lens according to Example 8 has the same configuration as the outline of the zoom lens according to Example 1. Table 22 shows basic lens data of the zoom lens according to Example 8, Table 23 shows specifications and variable surface distances, Table 24 shows aspherical surface coefficients thereof, and FIG. 18 shows aberration diagrams in a state in which the object at infinity is in focus.

TABLE 22

Example 8

| Sn | R | D | Nd | vd |
|---|---|---|---|---|
| 1 | 117.9380 | 2.0001 | 1.94301 | 23.89 |
| 2 | 76.9326 | 6.8318 | 1.49700 | 81.54 |
| 3 | -235.1687 | 0.1000 | | |
| 4 | 51.6919 | 5.4545 | 1.43875 | 94.66 |
| 5 | 199.9643 | DD[5] | | |
| 6 | 190.8337 | 5.5572 | 1.80100 | 34.97 |
| 7 | -49.8772 | 1.1100 | 1.58144 | 40.75 |
| 8 | 26.8123 | 6.1079 | | |
| 9 | -122.8918 | 1.1101 | 1.49700 | 81.54 |
| 10 | 35.3815 | 2.9999 | 1.89286 | 20.36 |
| 11 | 94.9888 | 3.3999 | | |
| 12 | -26.2522 | 0.8299 | 1.59551 | 39.24 |
| 13 | -59.2706 | DD[13] | | |
| 14 | -438.7602 | 1.9999 | 1.80809 | 22.76 |
| 15 | -83.4652 | 0.1926 | | |
| 16 | 137.8167 | 2.5599 | 1.60300 | 65.44 |
| 17 | -107.6322 | 0.7500 | 1.95906 | 17.47 |
| 18 | -438.7696 | DD[18] | | |
| 19(St) | ∞ | 1.0000 | | |

TABLE 22-continued

Example 8

| Sn | R | D | Nd | vd |
|---|---|---|---|---|
| 20 | 19.7701 | 6.0001 | 1.43875 | 94.66 |
| 21 | 100.2816 | 0.1500 | | |
| 22 | 26.0756 | 3.2001 | 1.49700 | 81.54 |
| 23 | 48.8918 | 0.8300 | | |
| 24 | 157.5313 | 0.6200 | 1.86850 | 43.11 |
| 25 | 13.6988 | 6.0101 | 1.49700 | 81.54 |
| 26 | −438.7695 | 5.6806 | | |
| 27 | 85.3953 | 5.0001 | 1.64769 | 33.79 |
| 28 | −16.1288 | 0.7101 | 1.61800 | 63.33 |
| 29 | 56.0471 | 1.2499 | | |
| 30 | −126.3844 | 1.0001 | 1.91082 | 35.25 |
| 31 | 50.2785 | 5.8558 | | |
| *32 | 34.4817 | 6.4212 | 1.50999 | 60.93 |
| *33 | −36.0800 | 14.3001 | | |
| 34 | −22.7268 | 1.0000 | 1.48749 | 70.24 |
| 35 | −58.9193 | 48.3266 | | |
| 36 | ∞ | 3.2000 | 1.51680 | 64.20 |
| 37 | ∞ | 1.2792 | | |

TABLE 23

Example 8

| | WIDE | MIDDLE | TELE |
|---|---|---|---|
| Zr | 1.0 | 1.5 | 1.9 |
| f | 100.95 | 150.41 | 191.80 |
| Bf | 51.72 | 51.72 | 51.72 |
| FNo. | 5.77 | 5.78 | 5.76 |
| 2ω (°) | 29.8 | 19.8 | 15.6 |
| Y | 27.35 | 27.35 | 27.35 |
| DD[5] | 1.25 | 15.13 | 21.15 |
| DD[13] | 26.94 | 13.36 | 2.15 |
| DD[18] | 14.00 | 13.71 | 18.89 |

TABLE 24

Example 8

| Sn | 32 | 33 |
|---|---|---|
| KA | 1.0000000E+00 | 1.0000000E+00 |
| A3 | 0.0000000E+00 | 0.0000000E+00 |
| A4 | −1.2008563E−05 | −5.4073643E−06 |
| A5 | −2.8632005E−07 | 8.2219196E−09 |
| A6 | 1.9244100E−07 | −1.5358472E−07 |
| A7 | −1.2020093E−08 | 5.4059857E−08 |
| A8 | −8.49595 80E−09 | −4.5818943E−09 |
| A9 | 1.2240345E−09 | −8.5989276E−10 |
| A10 | 7.5190994E−11 | 1.4878003E−10 |
| A11 | −1.9954732E−11 | 1.2488282E−12 |
| A12 | 1.4888993E−13 | −1.2314331E−12 |
| A13 | 1.1669895E−13 | 3.0756246E−14 |
| A14 | −3.4074334E−15 | 3.6975990E−15 |
| A15 | −2.5582588E−16 | −1.2917215E−16 |
| A16 | 1.0340328E−17 | −1.9293517E−18 |

Example 9

Figure 10:
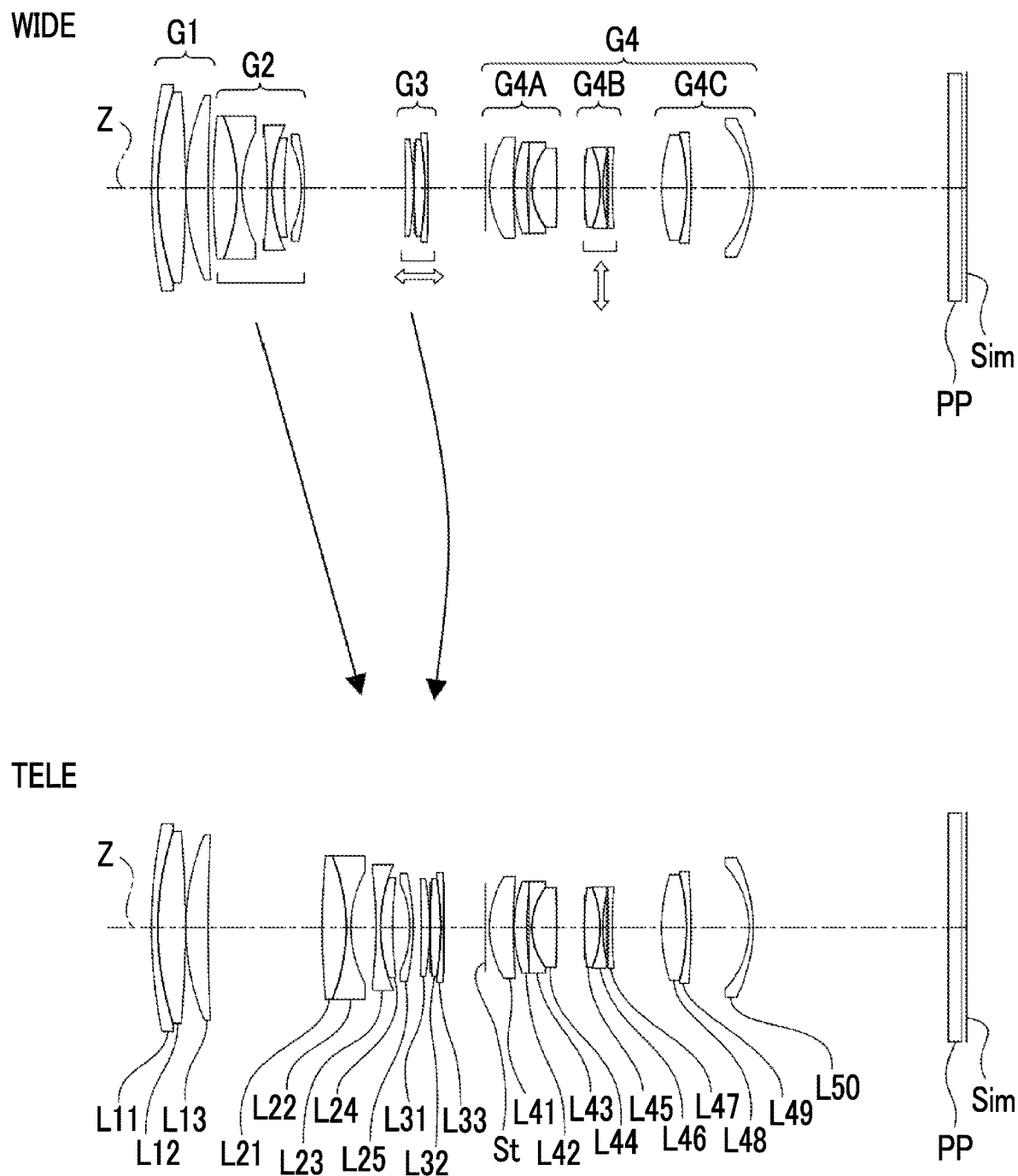
FIG. 10 is a diagram showing cross sections of configurations of a zoom lens according to Example 9 of the present invention at the wide-angle end and at the telephoto end and movement loci.
Figure 19:
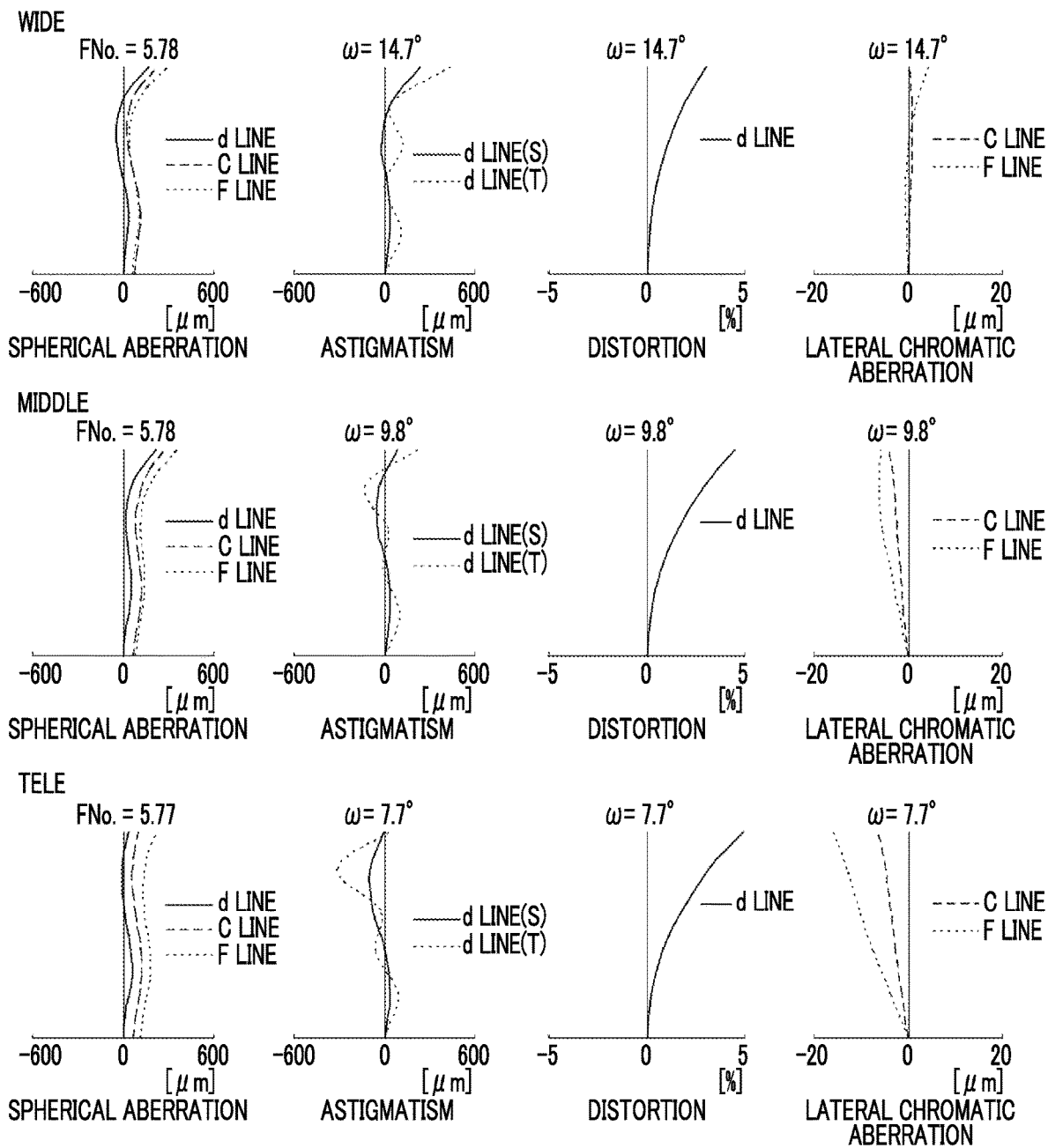
FIG. 19 shows aberration diagrams of the zoom lens according to Example 9 of the present invention.

FIG. 10 shows a cross-sectional view of a zoom lens according to Example 9. The zoom lens according to Example 9 has the same configuration as the outline of the zoom lens according to Example 1 except for the configuration of the rear group G4C. The rear group G4C of the zoom lens according to Example 9 consists of three lenses of lenses L48 to L50 in order from the object side to the image side, and the lens L48 and the lens L49 are cemented to each other. Table 25 shows basic lens data of the zoom lens according to Example 9, Table 26 shows specifications and variable surface distances, Table 27 shows aspherical surface coefficients thereof, and FIG. 19 shows aberration diagrams in a state in which the object at infinity is in focus.

TABLE 25

| Sn | R | D | Nd | vd |
|---|---|---|---|---|
| 1 | 139.2385 | 1.4999 | 1.94300 | 31.27 |
| 2 | 78.7459 | 6.6831 | 1.49700 | 81.54 |
| 3 | −306.9858 | 0.1000 | | |
| 4 | 60.7921 | 5.4372 | 1.43875 | 94.66 |
| 5 | 438.7697 | DD[5] | | |
| 6 | 180.6286 | 5.8828 | 1.80100 | 34.97 |
| 7 | −49.2060 | 1.1100 | 1.58144 | 40.75 |
| 8 | 29.9894 | 6.1079 | | |
| 9 | −126.2164 | 1.1101 | 1.49700 | 81.54 |
| 10 | 40.6033 | 2.9999 | 1.89286 | 20.36 |
| 11 | 102.6092 | 4.1639 | | |
| 12 | −27.1031 | 0.8299 | 1.59551 | 39.24 |
| 13 | −60.8052 | DD[13] | | |
| 14 | −438.6211 | 1.9999 | 1.80809 | 22.76 |
| 15 | −76.0169 | 0.1926 | | |
| 16 | 176.3717 | 2.5600 | 1.60300 | 65.44 |
| 17 | −77.8389 | 0.7499 | 1.95906 | 17.47 |
| 18 | −438.7697 | DD[18] | | |
| 19(St) | ∞ | 1.0000 | | |
| 20 | 23.7415 | 6.0001 | 1.43875 | 94.66 |
| 21 | 180.0990 | 0.1500 | | |
| 22 | 34.6730 | 3.1575 | 1.49700 | 81.54 |
| 23 | 102.2098 | 0.5500 | | |
| 24 | −6908.2955 | 0.6200 | 1.75764 | 54.75 |
| 25 | 16.7850 | 6.0101 | 1.49700 | 81.54 |
| 26 | −438.7696 | 6.8001 | | |
| 27 | 83.3271 | 3.8302 | 1.64769 | 33.79 |
| 28 | −27.2563 | 0.7101 | 1.61800 | 63.33 |
| 29 | 44.9574 | 1.2499 | | |
| 30 | −434.9528 | 1.0001 | 1.91082 | 35.25 |
| 31 | 127.0520 | 12.0001 | | |
| *32 | 43.9913 | 6.0797 | 1.50999 | 63.00 |
| 33 | −54.3825 | 1.1100 | 1.59551 | 39.24 |
| *34 | −192.8215 | 14.3001 | | |
| 35 | −23.0904 | 1.0000 | 1.48749 | 70.24 |
| 36 | −38.4602 | 47.3266 | | |
| 37 | ∞ | 3.2000 | 1.51680 | 64.20 |
| 38 | ∞ | 1.2292 | | |

TABLE 26

Example 9

| | WIDE | MIDDLE | TELE |
|---|---|---|---|
| Zr | 1.0 | 1.5 | 1.9 |
| f | 101.20 | 150.79 | 192.28 |
| Bf | 50.67 | 50.67 | 50.67 |
| FNo. | 5.78 | 5.78 | 5.77 |
| 2ω (°) | 29.4 | 19.6 | 15.4 |
| Y | 27.35 | 27.35 | 27.35 |
| DD[5] | 1.25 | 19.52 | 27.73 |
| DD[13] | 24.53 | 12.37 | 1.97 |
| DD[18] | 14.00 | 7.90 | 10.09 |

TABLE 27

Example 9

| Sn | 32 | 34 |
|---|---|---|
| KA | 1.0000000E+00 | 1.0000000E+00 |
| A3 | 0.0000000E+00 | 0.0000000E+00 |
| A4 | −3.7251769E−06 | 1.5573773E−06 |
| A5 | 2.6591006E−07 | −4.6132468E−07 |
| A6 | 1.5391363E−07 | 7.6414525E−08 |
| A7 | −1.1371176E−08 | −4.1610495E−09 |

TABLE 27-continued

Example 9

| Sn | 32 | 34 |
|---|---|---|
| A8  | −8.7900893E−09 | −3.0116698E−10 |
| A9  | 1.2320512E−09  | 1.8033078E−11  |
| A10 | 7.7099824E−11  | 3.6730568E−12  |
| A11 | −1.9788710E−11 | −4.5688688E−13 |
| A12 | 1.5210952E−13  | 2.4122583E−14  |
| A13 | 1.1659869E−13  | 8.1701811E−16  |
| A14 | −3.4853547E−15 | −2.3397791E−16 |
| A15 | −2.8370713E−16 | 1.2225388E−17  |
| A16 | 1.2446849E−17  | −1.7303208E−19 |

Table 28 shows values corresponding to Conditional Expressions (1) to (7) of the zoom lenses according to Examples 1 to 9. In Examples 1 to 9, the d line is set as the reference wavelength. Table 28 shows the values with the d line as the reference.

TABLE 28

| Expression number | | Example 1 | Example2 | Example3 | Example4 | Example5 |
|---|---|---|---|---|---|---|
| (1) | $TL^2/(Y \times ft)$ | 7.479 | 8.525 | 6.537 | 7.363 | 8.456 |
| (2) | f42r/f41r | −0.431 | −0.426 | −0.401 | −0.402 | −0.678 |
| (3) | f41r/d4b12 | −6.148 | −5.861 | −7.652 | −6.757 | −8.440 |
| (4) | G1TL/Gsum | 0.118 | 0.116 | 0.114 | 0.113 | 0.126 |
| (5) | N3p | 1.92287 | 1.92286 | 1.92286 | 1.92286 | 1.95906 |
| (6) | vdifmax | 47.69 | 46.46 | 37.62 | 46.46 | 50.23 |
| (7) | Bf/ft | 0.298 | 0.318 | 0.274 | 0.306 | 0.312 |

| Expression number | | Example6 | Example7 | Example8 | Example9 |
|---|---|---|---|---|---|
| (1) | $TL^2/(Y \times ft)$ | 8.013 | 6.150 | 7.170 | 7.413 |
| (2) | f42r/f41r | −0.408 | −0.377 | −0.466 | −0.634 |
| (3) | f41r/d4b12 | −7.033 | −8.229 | −5.356 | −8.469 |
| (4) | G1TL/Gsum | 0.111 | 0.108 | 0.100 | 0.093 |
| (5) | N3p | 1.92286 | 1.92286 | 1.80809 | 1.80809 |
| (6) | vdifmax | 44.01 | 46.46 | 61.18 | 61.18 |
| (7) | Bf/ft | 0.309 | 0.249 | 0.269 | 0.263 |

As can be seen from the aforementioned data, the zoom lens according to Examples 1 to 9 has a small size, is advantageous for high-speed focusing by having a configuration in which the focus lens group consists of three lenses, and realizes high optical performance by favorably correcting various aberrations.

Figure 20:
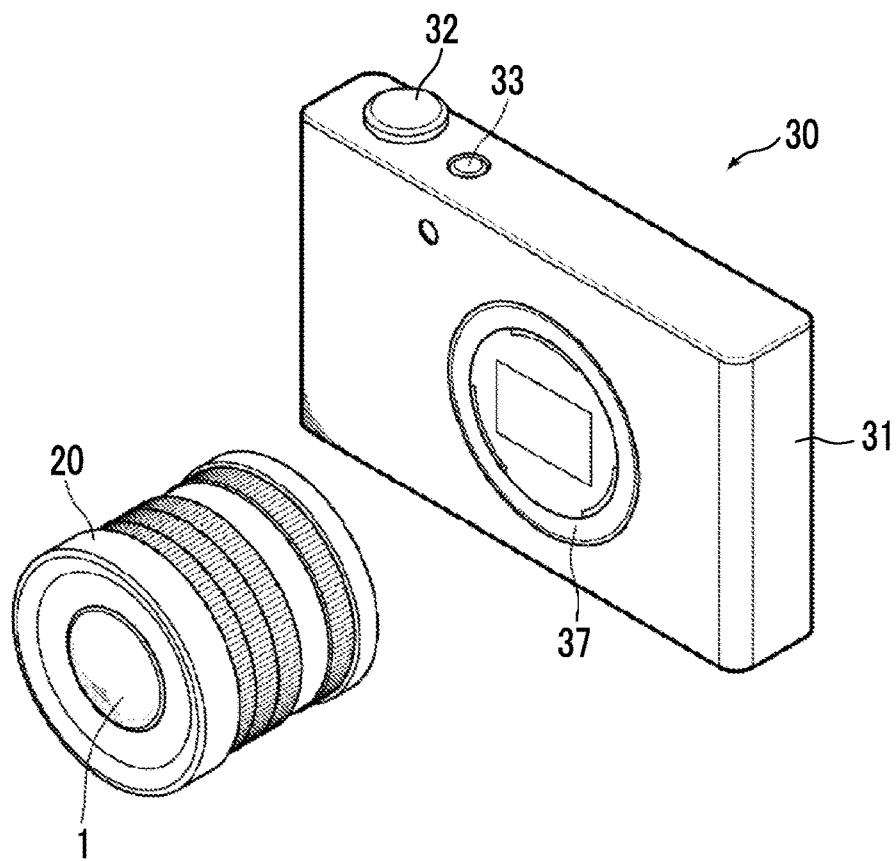
FIG. 20 is a perspective view of an imaging apparatus according to the embodiment of the present invention in front view.
Figure 21:
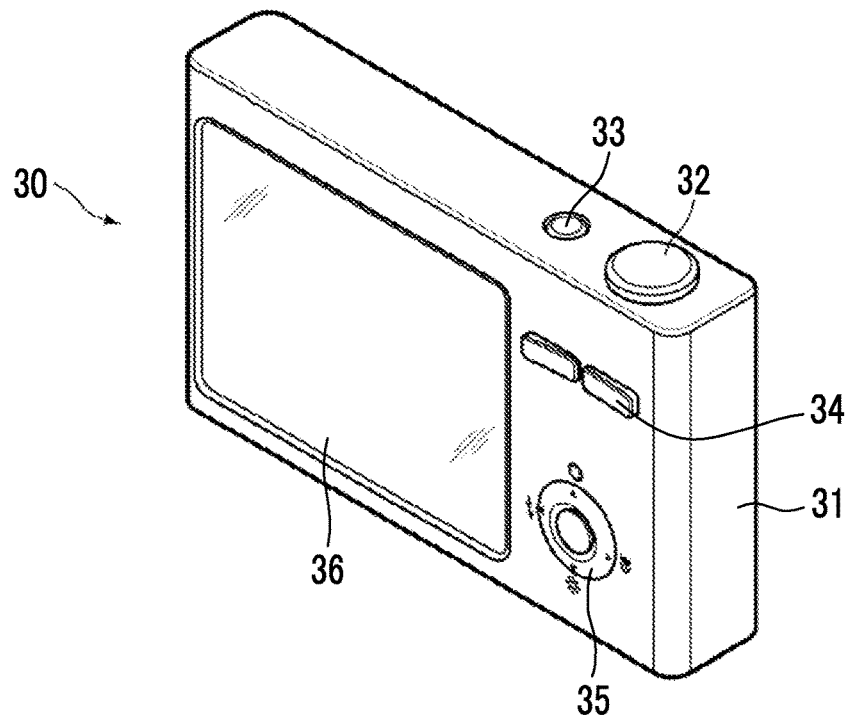
FIG. 21 is a perspective view of the imaging apparatus according to the embodiment of the present invention in rear view.

Next, an imaging apparatus according to an embodiment of the present invention will be described. FIGS. 20 and 21 are external views of a camera 30 which is the imaging apparatus according to the embodiment of the present invention. FIG. 20 is a perspective view in a case where the camera 30 is viewed from the front side, and FIG. 21 is a perspective view in a case where the camera 30 is viewed from the rear side. The camera 30 is a mirrorless digital camera to which an interchangeable lens 20 is detachably attached. The interchangeable lens 20 includes the zoom lens 1 according to the embodiment of the present invention which is accommodated in a lens barrel.

The camera 30 comprises a camera body 31, and a shutter button 32 and a power button 33 are provided on the upper surface of the camera body 31. A manipulation unit 34, a manipulation unit 35, and a display unit 36 are provided on the rear surface of the camera body 31. The display unit 36 displays a captured image and an image within an angle of view before the image is captured.

An imaging opening on which rays from an imaging target are incident is formed in the central portion of the front surface of the camera body 31, a mount 37 is provided in a position corresponding to the imaging opening, and the interchangeable lens 20 is attached to the camera body 31 through the mount 37.

An imaging element such as a charge-coupled device (CCD) or a complementary metal-oxide-semiconductor (CMOS) that outputs imaging signals corresponding to a subject image formed by the interchangeable lens 20, a signal processing circuit that generates an image by processing the imaging signals output from the imaging element, and a recording medium for recording the generated image are provided within the camera body 31. In the camera 30, it is possible to image a still image or a motion picture by pressing the shutter button 32, and image data obtained through the imaging is recorded in the recording medium.

The present invention has been hitherto described through embodiments and examples, but the present invention is not limited to the above-mentioned embodiments and examples, and may be modified into various forms. For example, values such as the radius of curvature, the surface distance, the refractive index, the Abbe number, and the aspherical surface coefficient of each lens are not limited to the values shown in the numerical examples, and different values may be used therefor.

The imaging apparatus according to the embodiment of the present invention is not limited to the examples. For example, various aspects such as cameras other than mirrorless types, film cameras, video cameras, movie shooting cameras, and broadcasting cameras may be used.

What is claimed is:

1. A zoom lens consists of:
in order from an object side to an image side,
a first lens group which has a positive refractive power;
a second lens group which has a negative refractive power and moves during zooming;
a third lens group which has a positive refractive power and moves during zooming; and
a fourth lens group which has a positive refractive power and is fixed with respect to an image plane during zooming, wherein
a distance between the lens groups adjacent to each other in an optical axis direction changes during zooming,
only the third lens group moves during focusing, an object-side surface of a lens closest to an object is a convex surface, assuming that a sum of an on-axis distance from a lens surface closest to the object at a telephoto end to a lens surface closest to an image and back focus at an air-equivalent distance is TL, a maximum image height is Y, and a focal length of the zoom lens at the telephoto end in a state in which an object at infinity is in focus is ft, Conditional Expression (1) expressed by $5<TL^2/(Y\times ft)<9.5$ is satisfied, the fourth lens group consists of a front group having a positive refractive power, an intermediate group having a negative refractive power, and a rear group having a positive refractive power in order from the object side to the image side, only the intermediate group moves in a direction crossing an optical axis during image shake correction, a meniscus-shaped single lens having a negative refractive power in which an object-side surface is a concave surface is disposed on a side of the rear group closest to the image, and assuming that a focal length of the single lens of the rear group closest to the image is f41r and an on-axis distance between the single lens of the rear group closest to the image and the lens disposed so as to be adjacent to the object side of the single lens of the rear group closest to the image is d4b12r, Conditional Expression (3-1) expressed by $-9<f41r/d4b12r<-3$ is satisfied.

2. The zoom lens according to claim 1,
wherein, assuming that a focal length of the single lens of the rear group closest to the image is f41r and a focal length of a single lens or a cemented lens disposed so as to be adjacent to the object side of the single lens of the rear group closest to the image is f42r, Conditional Expression (2) expressed by $-0.75<f42r/f41r<-0.2$ is satisfied.

3. The zoom lens according to claim 1,
wherein the first lens group is fixed with respect to the image plane during zooming.

4. The zoom lens according to claim 1,
wherein a negative lens in which an image-side surface is a convex surface is disposed on a side of the second lens group closest to the image.

5. The zoom lens according to claim 1,
wherein, assuming that an on-axis distance from a lens surface closest to the object to a lens surface of the first lens group closest to the image is G1TL and an on-axis distance from a lens surface closest to the object at the telephoto end to a lens surface of the fourth lens group closest to the image is Gsum, Conditional Expression (4) expressed by $0.08<G1TL/Gsum<0.14$ is satisfied.

6. The zoom lens according to claim 1,
wherein the first lens group includes at least one set of cemented lens in which a negative lens and a positive lens are cemented to each other in order from the object side.

7. The zoom lens according to claim 1,
wherein the first lens group consists of one negative lens and two positive lenses.

8. The zoom lens according to claim 1,
wherein the third lens group includes at least one positive lens, and assuming that a refractive index of a positive lens within the third lens group closest to the object at a d line is N3p, Conditional Expression (5) expressed by $1.7<N3p<2.2$ is satisfied.

9. The zoom lens according to claim 1,
wherein the third lens group includes at least one set of cemented lens in which a positive lens and a negative lens are cemented to each other in order from the object side.

10. The zoom lens according to claim 1,
wherein the third lens group consists of one positive lens and one set of cemented lens.

11. The zoom lens according to claim 1,
wherein the second lens group includes at least one set of cemented lens in which at least one positive lens and at least one negative lens are cemented to each other.

12. The zoom lens according to claim 11,
wherein, assuming that an absolute value of a difference between an Abbe number of the positive lens within the cemented lens with a d line as a reference and an Abbe number of the negative lens within the cemented lens with the d line as the reference in each cemented lens of the second lens group is vdif and a maximum value of the vdif is vdifmax, Conditional Expression (6) expressed by $30<vdifmax<75$ is satisfied.

13. The zoom lens according to claim 1,
wherein, assuming that the back focus at the air-equivalent distance is Bf, Conditional Expression (7) expressed by $0.15<Bf/ft<0.4$ is satisfied.

14. The zoom lens according to claim 1,
wherein Conditional Expression (1-1) expressed by $5.5<TL^2/(Y\times ft)<9$ is satisfied.

15. The zoom lens according to claim 5,
wherein Conditional Expression (4-1) expressed by $0.09<G1TL/Gsum<0.13$ is satisfied.

16. The zoom lens according to claim 8,
wherein Conditional Expression (5-1) expressed by $1.8<N3p<2.2$ is satisfied.

17. An imaging apparatus comprising the zoom lens according to claim 1.

* * * * *